(12) United States Patent
Saeda et al.

(10) Patent No.: US 10,931,833 B2
(45) Date of Patent: Feb. 23, 2021

(54) IMAGE FORMING APPARATUS, SERVICE SYSTEM, CONTROL METHOD, AND RECORDING MEDIUM STORING COMPUTER PROGRAM

(71) Applicant: SHARP KABUSHIKI KAISHA, Sakai (JP)

(72) Inventors: Masao Saeda, Sakai (JP); Yasuhiro Nakai, Sakai (JP); Kohji Katamoto, Sakai (JP); Kohichi Murakami, Sakai (JP); Yasutomo Hayano, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 16/411,660

(22) Filed: May 14, 2019

(65) Prior Publication Data
US 2019/0364159 A1    Nov. 28, 2019

(30) Foreign Application Priority Data
May 22, 2018    (JP) .............................. JP2018-097696

(51) Int. Cl.
*G06F 15/00* (2006.01)
*H04N 1/00* (2006.01)
(Continued)

(52) U.S. Cl.
CPC ....... *H04N 1/00225* (2013.01); *G06F 3/1286* (2013.01); *G06F 3/1292* (2013.01);
(Continued)

(58) Field of Classification Search
CPC ........... H04N 1/00225; H04N 1/00411; H04N 1/32101; G06F 3/1286; G06F 3/1292; G06Q 20/06; G06Q 20/08
(Continued)

(56) References Cited

U.S. PATENT DOCUMENTS

| 2008/0297828 | A1* | 12/2008 | Niikura | .............. | H04N 1/00209 |
| | | | | | 358/1.15 |
| 2014/0153039 | A1* | 6/2014 | Sasase | ............... | H04N 1/00307 |
| | | | | | 358/1.15 |

(Continued)

FOREIGN PATENT DOCUMENTS

| CN | 104754195 A | 7/2015 |
| CN | 105827887 A | 8/2016 |

(Continued)

*Primary Examiner* — Mark R Milia
(74) *Attorney, Agent, or Firm* — ScienBiziP, P.C.

(57) ABSTRACT

An image forming apparatus includes an image reading unit that generates image data from an image on an original document, a short-range wireless communication unit that performs communication via short-range wireless communication, an acquisition unit that acquires identification information from a plurality of mobile terminals within a communication area, a display unit that displays a plurality of pieces of identification information, an operation input unit that accepts selection of a plurality of pieces of identification information, which is at least some of the pieces of identification information, in accordance with operation by an operator and that specifies a selection group including a plurality of mobile terminals indicated by the selected plurality of pieces of identification information, and a transceiving unit that transmits image data only to the plurality of mobile terminals included in the selection group via the wireless communication unit.

18 Claims, 17 Drawing Sheets

(51) Int. Cl.
  *G06F 3/12* (2006.01)
  *G06Q 30/06* (2012.01)
  *H04N 1/32* (2006.01)
  *G06Q 20/08* (2012.01)
(52) U.S. Cl.
  CPC ............ *G06Q 20/08* (2013.01); *G06Q 30/06* (2013.01); *H04N 1/00411* (2013.01); *H04N 1/32101* (2013.01)
(58) Field of Classification Search
  USPC ....................................................... 358/1.15
  See application file for complete search history.

(56) References Cited

U.S. PATENT DOCUMENTS

| | | |
|---|---|---|
| 2015/0189179 A1 | 7/2015 | Eom |
| 2016/0219190 A1 | 7/2016 | Sugiyama et al. |

FOREIGN PATENT DOCUMENTS

| | | | |
|---|---|---|---|
| JP | 2015-035767 A | 2/2015 | |
| JP | 2015-043123 A | 3/2015 | |

* cited by examiner

| MODEL NAME | USER NAME |
|---|---|
| Phone A | ZZ ICHIROH |

| OS NAME | MODEL NAME | USER NAME |
|---|---|---|
| Operating System 3.0 | Device A | XX TAROH |

| NAME | COMPANY NAME | E-MAIL ADDRESS | GROUP |
|---|---|---|---|
| ANDOH TAROH | COMPANY YY | andoh.taroh@YY.co.jp | AGr |
| ITOH TAROH | COMPANY XX | itoh.taroh@XX.co.jp | BGr |
| UZAKI TAROH | COMPANY ZZ | uzaki.taroh@ZZ.co.jp | CGr |
| ETOH TAROH | COMPANY XY | etoh.taroh@XY.co.jp | DGr |
| OKAMOTO TAROH | COMPANY XZ | okamoto.taroh@XZ.co.jp | EGr |

FIG. 17

| | 1 TO 5 PERSONS (r1) | 6 TO 10 PERSONS (r2) | 11 TO 20 PERSONS (r3) | 21 TO 30 PERSONS (r4) | 31 TO 50 PERSONS (r5) | 51 TO 80 PERSONS (r6) | 81 TO 100 PERSONS (r7) |
|---|---|---|---|---|---|---|---|
| LESS THAN 1 MB (r11) | 30 YEN | 150 YEN | 200 YEN | 350 YEN | 500 YEN | 750 YEN | 1,000 YEN |
| 1 TO 3 MB (r12) | 36 YEN | 180 YEN | 240 YEN | 420 YEN | 600 YEN | 900 YEN | 1,200 YEN |
| 3 TO 5 MB (r13) | 39 YEN | 195 YEN | 260 YEN | 455 YEN | 650 YEN | 975 YEN | 1,300 YEN |
| 5 TO 10 MB (r14) | 42 YEN | 210 YEN | 280 YEN | 490 YEN | 700 YEN | 1,050 YEN | 1,400 YEN |
| 10 TO 15 MB (r15) | 45 YEN | 225 YEN | 300 YEN | 525 YEN | 750 YEN | 1,125 YEN | 1,500 YEN |
| 15 TO 20 MB (r16) | 48 YEN | 240 YEN | 320 YEN | 560 YEN | 800 YEN | 1,200 YEN | 1,600 YEN |

136

IMAGE FORMING APPARATUS, SERVICE SYSTEM, CONTROL METHOD, AND RECORDING MEDIUM STORING COMPUTER PROGRAM

BACKGROUND

1. Field

The present disclosure relates to a technique for transmitting and receiving data between an image forming apparatus and a plurality of mobile terminals via short-range wireless communication, and more specifically to a technique for transmitting image data read by the image forming apparatus to the plurality of mobile terminals via short-range wireless communication.

2. Description of the Related Art

Multi-function copiers (hereinafter referred to as image forming apparatuses) installed in public places such as convenience stores provide service to users, such as a printing service for printing pictures or documents stored in smartphones (hereinafter referred to as mobile terminals) of the users and a scanning service for reading original document images on sheets and loading the images into the mobile terminals.

The image forming apparatus and the mobile terminals transmit and receive data to and from each other via short-range wireless communication such as Wi-Fi.

The image forming apparatus typically reads an original image on a sheet and loads the image into a mobile terminal in accordance with the following operation procedure, for example.

On an operation screen of the mobile terminal, a user selects the function of receiving image data transmitted from the image forming apparatus. Then, on an operation screen of the image forming apparatus, the user selects the function of reading an original document image on a sheet and loading the image into the mobile terminal. Accordingly, a Wi-Fi connection destination and a connection password are displayed on the image forming apparatus. Then, the user inputs, on the mobile terminal, the Wi-Fi connection destination displayed on the image forming apparatus and then inputs, on the mobile terminal, the connection password displayed on the image forming apparatus.

Through the operations described above, the setup of Wi-Fi connection between the image forming apparatus and the mobile terminal is completed, and the image data read by the image forming apparatus is transmitted to the mobile terminal.

However, as described above, the configuration of Wi-Fi connection between the image forming apparatus and the mobile terminal involves inputting, on the mobile terminal, the Wi-Fi connection destination and the connection password displayed on the operation screen of the image forming apparatus. Such Wi-Fi connection configuration may be time-consuming for the user.

To address this issue, Japanese Unexamined Patent Application Publication No. 2015-35767 discloses an image forming apparatus. The image forming apparatus wirelessly communicates with mobile terminals to automatically detect mobile terminals available for communication within a communication area, and displays a destination selection screen showing the terminal names, media access control (MAC) addresses, email addresses, and so on of the detected mobile terminals on a display unit of the image forming apparatus. A user selects a desired mobile terminal on the displayed destination selection screen. The image forming apparatus transmits information to the selected mobile terminal. As described above, the simplified operation is used to configure wireless connection between the image forming apparatus and a mobile terminal.

Japanese Unexamined Patent Application Publication No. 2015-43123 discloses an image display apparatus to which a plurality of information processing devices are connected. The image display apparatus provides intuitive recognition of the correspondence between the source and the destination to a user during a data transfer operation for transferring data between the information processing devices to allow the user to perform data transfer with a simple operation.

As described above, in Japanese Unexamined Patent Application Publication No. 2015-35767, the operation of configuring wireless connection between an image forming apparatus and a mobile terminal is simplified. However, the connection destination of the Image forming apparatus is merely one of the mobile terminals to which information is to be transmitted.

On the other hand, there is a demand for a plurality of mobile terminals to receive an original document image read by an image forming apparatus over short-range wireless communication.

For example, a plurality of users having a friend relationship gather around an image forming apparatus installed in a convenience store, and the image forming apparatus reads an image on an original document and transmits image data of the read image to the respective mobile terminals.

In this situation, if a mobile terminal of a third party who does not have a friend relationship with the plurality of users having a friend relationship is allowed to join a group including the mobile terminals of the users having a friend relationship, the image data read by the image forming apparatus can be transmitted to the mobile terminal of the third party, which may cause inconvenience.

It is desirable to provide an image forming apparatus, a service system, a control method, and a recording medium storing a computer program that can minimize the occurrence of the inconvenience described above while satisfying the demand to transmit image data read by the image forming apparatus to the respective mobile terminals of a plurality of users having a certain relationship over short-range wireless communication.

SUMMARY

According to an aspect of the disclosure, there is provided an image forming apparatus including a wireless communication unit, for communicating with a mobile terminal located in a communication area. The image forming apparatus including an image reading unit, an acquisition unit, a display unit, an input unit, and a data communication unit. The image reading unit reads an image on an original document to generate image data. The acquisition unit acquires a plurality of pieces of identification information from a plurality of mobile terminals located in the communication area via the wireless communication unit, each of the plurality of pieces of identification information indicating one of the plurality of mobile terminals. The display unit displays the acquired plurality of pieces of identification information. The input unit selects at least one of the pieces of identification information displayed on the display unit. The data communication unit transmits the image data to only a mobile terminal corresponding to a piece of identification information selected by the input unit via the wireless communication unit.

According to another aspect of the disclosure, there is provided a service system including a plurality of mobile terminals and an image forming apparatus including a wireless communication unit and communicates with a mobile terminal located in a communication area thereof among the plurality of mobile terminals. The image forming apparatus includes an image reading unit, an acquisition unit, a display unit, an input unit, and a data communication unit. The image reading unit reads an image on an original document to generate image data. The acquisition unit acquires a plurality of pieces of identification information from a plurality of mobile terminals located in the communication area via the wireless communication unit, each of the plurality of pieces of identification information indicating one of the plurality of mobile terminals located in the communication area. The display unit displays the acquired plurality of pieces of identification information. The input unit selects at least one of the pieces of identification information displayed on the display unit. The data communication unit transmits the image data to only a mobile terminal corresponding to a piece of identification information selected by the input unit via the wireless communication unit.

According to another aspect of the disclosure, there is provided a control method performed by an image forming apparatus. The image forming apparatus includes a wireless communication unit and communicates with a mobile terminal located in a communication area thereof. The control method includes reading an image on an original document to generate image data; acquiring a plurality of pieces of identification information from a plurality of mobile terminals located in the communication area via the wireless communication unit, each of the plurality of pieces of identification information indicating one of the plurality of mobile terminals; displaying the acquired plurality of pieces of identification information; selecting at least one of the displayed pieces of identification information; and transmitting the image data to only a mobile terminal corresponding to a selected piece of identification information via the wireless communication unit.

According to another aspect of the disclosure, there is provided a recording medium storing a computer program for control. The computer program is executable by an image forming apparatus. The image forming apparatus includes a wireless communication unit and communicates with a mobile terminal located in a communication area thereof. The computer program reads an image on an original document to generate image data; acquire a plurality of pieces of identification information from a plurality of mobile terminals located in the communication area via the wireless communication unit, each of the plurality of pieces of identification information indicating one of the plurality of mobile terminals; display the acquired plurality of pieces of identification information; select at least one of the displayed pieces of identification information; and transmit the image data to only a mobile terminal corresponding to a selected piece of identification information via the wireless communication unit.

BRIEF DESCRIPTION OF THE DRAWINGS

FIGS. 10A and 10B illustrate examples of basic information;

FIG. 10C illustrates an example of an email address book;

FIG. 17 illustrates an example of a fee schedule including fees defined by transmission data sizes and the numbers of users.

DESCRIPTION OF THE EMBODIMENTS

A service system 1 according to an embodiment of the present disclosure will be described with reference to the drawings.

1.1 Service System 1

Figure 1:
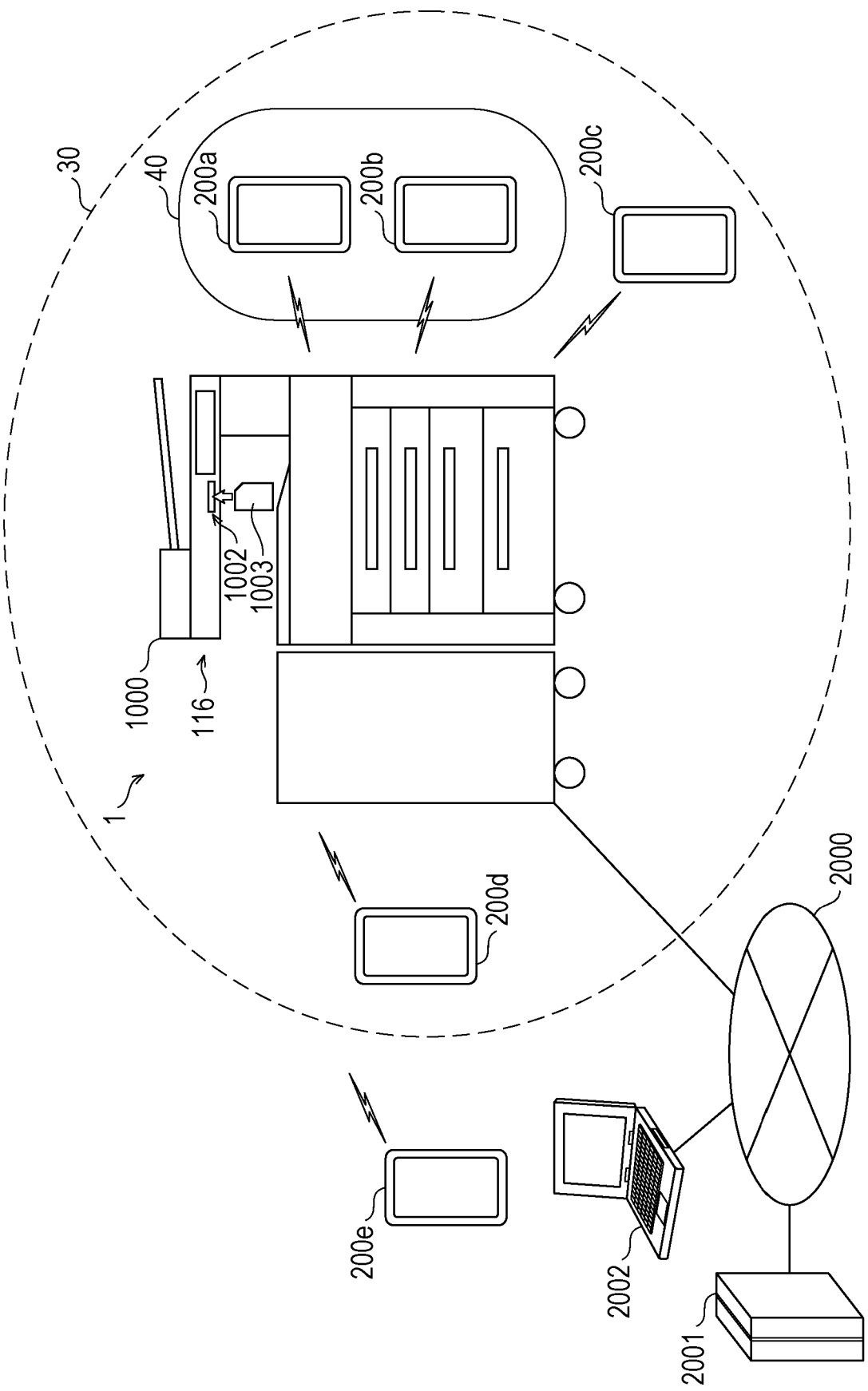
FIG. 1 is a schematic configuration diagram illustrating a schematic configuration of a service system.

FIG. 1 is a schematic configuration diagram illustrating a schematic configuration of the service system 1.

The service system 1 includes an image forming apparatus 1000 installed in, for example, a public place such as a convenience store, and mobile terminals 200a, 200b, 200c, and 200d located in a wireless communication area 30 centered on the image forming apparatus 1000, such that the image forming apparatus 1000 and the mobile terminals 200a, 200b, 200c, and 200d are interconnected via short-range wireless communication so as to be capable of communicating with each other. As illustrated in FIG. 1, a mobile terminal 200e is located outside the wireless communication area 30 and thus is not connected to the image forming apparatus 1000 via short-range wireless communication. The short-range wireless communication is implemented using Wi-Fi based communication specified in the Institute of Electrical and Electronics Engineers (IEEE) 802.11. Alternatively, short-range communication based on IEEE 802.15.1 (Bluetooth (registered trademark) based wireless communication, hereinafter referred to as Bluetooth), short-range communication based on the International Organization for Standardization (ISO) 14443 Type A and Type B standards (Near Field Communication, hereinafter referred to as NFC), or infrared communication may be used.

The image forming apparatus 1000 is connected to a server device 2001 via a public network 2000. The image forming apparatus 1000 has a slot 1002 to which a removable medium 1003 is removably attached in accordance with operation by the user. The removable medium 1003 is a transportable recording medium that can be carried by a user, such as a memory card or a disk medium.

A device 2002 is further connected to the public network 2000. The device 2002 is a personal computer, for example.

The service system 1 provides services to users, such as a printing service for printing document data, picture data, and so on stored in the mobile terminals 200a, 200b, etc. onto paper media by using the image forming apparatus 1000, and a scanning service for transmitting multi-level image data read by the image forming apparatus 1000 from an original document to the mobile terminals 200a, 200b, etc.

In the scanning service, in addition to the transmission of image data to the mobile terminals 200a, 200b, etc., the image data can further be output to other multiple types of output destinations. A user can select the removable medium 1003, the server device 2001, and the device 2002 as a plurality of types of output destinations. The image forming apparatus 1000 writes the image data to the removable medium 1003. The image forming apparatus 1000 transmits the image data to the server device 2001 via the public network 2000. The image forming apparatus 1000 attaches the image data to an electronic mail and transmits the electronic mail to the device 2002.

The mobile terminals 200a and 200b, which are included in a group 40 illustrated in FIG. 1, are owned by two or more users having a certain relationship. The group 40 is referred to as the selection group 40. Examples of the certain relationship may include a relationship between a plurality of users who belong to the same organization in the workplace, a friend relationship, and a family relationship. The image forming apparatus 1000 serves as a service location common to the users of the mobile terminals 200a and 200b, who use scanning services over short-range wireless communication.

For example, the mobile terminals 200a and 200b located in the wireless communication area 30 transmit picture data stored therein to the image forming apparatus 1000 via short-range wireless communication, and the image forming apparatus 1000 receives the picture data and prints the received picture data by using a printing unit 115 described below.

The image forming apparatus 1000 reads an original document image on an original document by using an image reading unit 116 described below to generate multi-level image data, and transmits the generated multi-level image data to the mobile terminals 200a and 200b located in the wireless communication area 30 via short-range wireless communication. The mobile terminals 200a and 200b receive the multi-level image data and store the received multi-level image data. The mobile terminals 200a and 200b are capable of displaying the stored multi-level image data in accordance with operation by their users.

Accordingly, even when away from home, a user stops by a convenience store and can print data stored in the mobile terminal onto a paper medium or store image data read from a paper medium or the like in the mobile terminal to utilize the paper medium and the data. In addition, only a plurality of specific mobile terminals share the single image forming apparatus 1000 for use over short-range wireless communication. The image forming apparatus 1000 excludes the mobile terminals 200c and 200d, which happen to be present in the same convenience store and located in the wireless communication area 30, but which are not included in the selection group 40, from the target of the scanning service.

1.2 Image Forming Apparatus 1000

Figure 2:
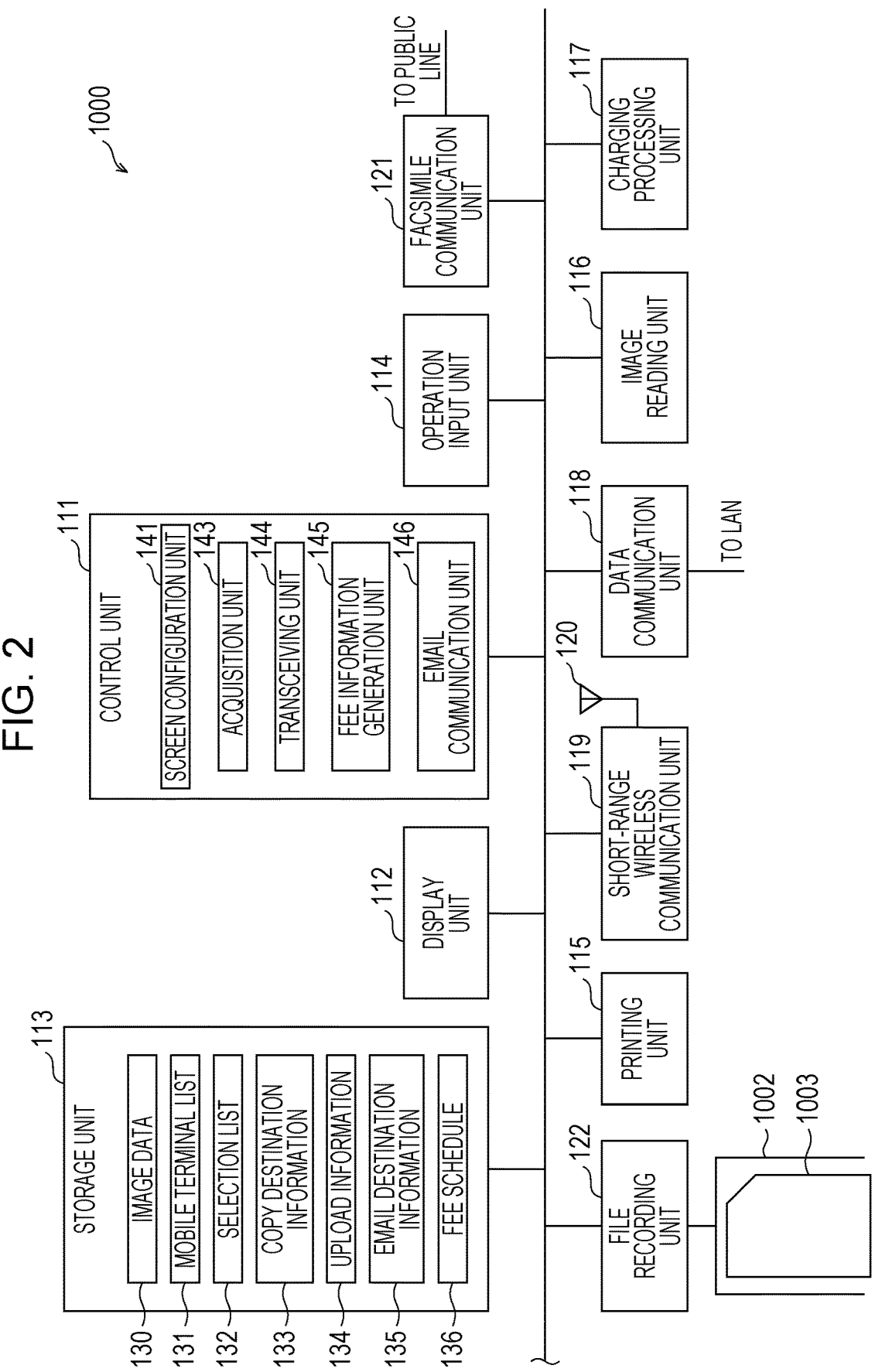
FIG. 2 is a functional block diagram illustrating a functional configuration of an image forming apparatus.

FIG. 2 is a functional block diagram illustrating a functional configuration of the image forming apparatus 1000.

The image forming apparatus 1000 is an apparatus having functions such as a copying function, a facsimile function, and a printer function. As illustrated in FIG. 2 the image forming apparatus 1000 includes a control unit 111, a display unit 112, a storage unit 113, an operation input unit 114, a printing unit 115, an image reading unit 116, a charging processing unit 117, a data communication unit 118, a short-range wireless communication unit 119, an antenna 120, a facsimile communication unit 121, and a file recording unit 122.

(1) Storage Unit 113

The storage unit 113 includes a random access memory (RAM) serving as a work area for a control program executed by the control unit 111, a nonvolatile memory, a built-in recording medium contained in the image forming apparatus 1000, and so on. The storage unit 113 stores image data 130, which is obtained by the scanning operation a mobile terminal list 131, a selection list 132, copy destination information 133, upload information 134, email destination information 135, and a fee schedule 136.

The image data 130 is generated by optically reading an image on an original document on a paper medium or the like and performing image processing on the read image. The image data 130 is saved to the storage unit 113 in a file format such as Joint Photographic Experts Group (JPEG), Portable Document Format (PDF), or Tagged Image File Format (TIFF).

Figure 3A:
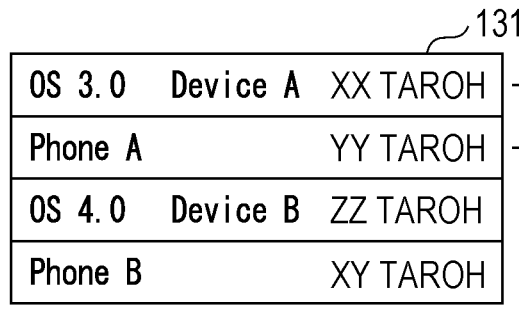
FIG. 3A illustrates an example of a mobile terminal list.

The mobile terminal list 131 includes identification information that identifies the mobile terminals 200a, 200b, 200c, and 200d, which are mobile terminals located in the wireless communication area 30 and which are detected by the image forming apparatus 1000 through a search for a mobile terminal. FIG. 3A illustrates an example of the mobile terminal list 131. In FIG. 3A, the character strings "'OS 3.0' 'Device A' 'XX Taroh'", "'Phone A' 'YY Taroh'", "'OS 4.0' 'Device B' 'ZZ Taroh'", and "'Phone B' 'XY Taroh'" are pieces of identification information assigned to the mobile terminals 200a, 200b, 200c, and 200d, respectively. The mobile terminal list 131 presents these pieces of identification information as a list to clarify the presence of mobile terminals located in the wireless communication area 30.

Figure 3B:
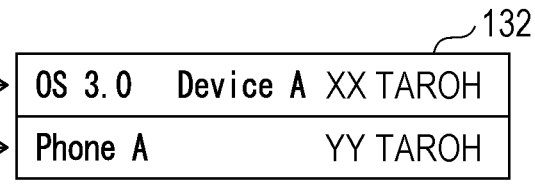
FIG. 3B illustrates an example of a selection list.

The selection list 132 is generated by grouping pieces of identification information that identify mobile terminals selected by the user as mobile terminals included in the selection group 40 (in the example in FIG. 1, the mobile terminals 200a and 200b) among the mobile terminals 200a, 200b, 200c, and 200d detected by the image forming apparatus 1000 through a search for a mobile terminal and clearly shown in the mobile terminal list 131. FIG. 3B illustrates an example of the selection list 132. In FIG. 3B, the character strings "'OS 3.0' 'Device A' 'XX Taroh'" indicate the mobile terminal 200a, which is selected as a mobile terminal possessed by a user included in the selection group 40 from among the mobile terminals in the mobile terminal list 131. Also, the character strings "'Phone A' 'YY Taroh'" indicate the mobile terminal 200b, which is selected as a mobile terminal possessed by a user included in the selection group 40 from among the mobile terminals in the mobile terminal list 131. The image forming apparatus 1000 establishes wireless connection with a mobile terminal identified with identification information included in the selection list 132 in ad hoc mode, and performs short-range wireless communication with the mobile terminal. In contrast, the image forming apparatus establishes no wireless connection with a mobile terminal indicated by identification information not included in the selection list 132 in ad hoc mode.

Figure 3C:
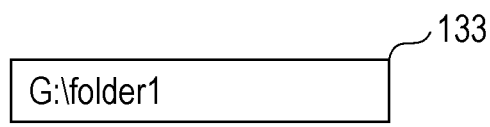
FIG. 3C illustrates an example of copy destination information.

The copy destination information 133 indicates a storage folder configured on the removable medium 1003 attached to the slot 1002 as the copy destination of the image data 130. In FIG. 3C, "G:\folder1" indicates an example of a folder configured on the removable medium 1003 and designated on a folder input screen SC22 described below.

Figure 3D:
FIG. 3D illustrates an example of upload information.

The upload information 134 indicates one storage location in the server device 2001 as the destination. In FIG. 3D, "http://www.cloud1.com/user111" is an example uniform resource locator (URL) entered as the upload target. The "www.cloud1.com" portion indicates the server device 2001, for example.

Figure 3E:
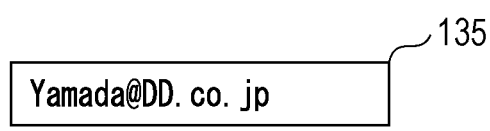
FIG. 3E illustrates an example of email destination information.

The email destination information 135 indicates an email address to which an electronic mail is to be sent. The image data 130 is attached to an electronic mail directed to this email address and the electronic mail is transmitted. In FIG. 3E, "Yamada@DD.co.jp" is an example email address entered on an email address input screen SC25 described below.

The fee schedule 136 indicates a plurality of fees in association with numerical ranges for the data size of image data and numerical ranges for the number of users who use the scanning service (see FIG. 17).

(2) Control Unit 111

The control unit 111 reads a necessary program or the like from the storage unit 113 and executes the program or the like to control the overall operation of the image forming apparatus 1000. The control unit 111 includes a screen configuration unit 141, an acquisition unit 143, a transceiving unit 144, a fee information generation unit 145, an email communication unit 145, and so on.

The screen configuration unit 141 generates various screens to promote the input of a plurality of types of output destinations of image data and specific information on output destinations for each type to execute the scanning service, and displays the screens on the display unit 112.

When the operation input unit 114 receives the operation of selecting mobile terminals positioned in the wireless communication area 30 as one of the plurality of types of output destinations, the acquisition unit 143 acquires, from one or multiple mobile terminals located in the wireless communication area 30, identification information that identifies the mobile terminal(s) by using the short-range wireless communication unit 119.

The transceiving unit 144 transmits and receives data between the image forming apparatus 1000 and mobile terminals. For example, the transceiving unit 144 transmits an identification number to each mobile terminal by using the short-range wireless communication unit 119. Further, the transceiving unit 144 receives picture data, document data, and so on from each mobile terminal by using the short-range wireless communication unit 119, and transmits multi-level image data to each mobile terminal by using the short-range wireless communication unit 119. The transceiving unit 144 further transmits fee information described below to one specific mobile terminal or to a plurality of mobile terminals.

The fee information generation unit 145 generates fee information indicating a fee for the provision of a printing service or a scanning service. In the case of a single mobile terminal, the fee information generation unit 145 generates fee information on the mobile terminal. In the case of a plurality of mobile terminals, the fee information generation unit 345 distributes fees to be paid by the plurality of mobile terminals to the respective mobile terminals and generates fee information on each of the mobile terminals. Further, the fee information generation unit 145 determines whether to collectively charge a specific one of the plurality of mobile terminals or individually charge the plurality of mobile terminals in accordance with a payment method described below (whether to collectively charge one specific mobile terminal or individually charge a plurality of mobile terminals). When one specific mobile terminal is collectively charged, the fee information generation unit 145 generates fee information indicating fees collectively charged to the specific mobile terminal.

When output via email address is designated as the type of output destination of the image data 130, the email communication unit 146 attaches the image data 130 to an electronic mail directed to the email address indicated by the email destination information 135 stored in the storage unit 113, and transmits the electronic mail to the device 2002 connected to the public network 2000. Here, the email address indicates the device 2302 as the destination.

(3) Image Reading Unit 116 and Printing Unit 115

The image reading unit 116 reads an original document image on an original document and generates multi-level image data.

The printing unit 115 prints and records, for example, the multi-level image data generated by the image reading unit 116 or picture data or document data received from each mobile terminal on a paper medium or the like by using electrophotographic technology.

(4) Display Unit 112

The display unit 112 is a liquid crystal display device, for example. The display unit 112 may be any type of device such as an electroluminescent (EL) display device. The display unit 112 may be a compact one formed integrally with the image forming apparatus 1000 or may be a large one connected to the image forming apparatus 1000. The display unit 112 sequentially displays the various screens generated by the screen configuration unit 141 in accordance with a user operation to provide an interactive operation environment to the user.

(5) Operation Input Unit 114

The operation input unit 114 has a plurality of operation keys and a touch panel overlaid on a screen of the display unit 112. The operation input unit 114 outputs an input instruction corresponding to an operation with the operation keys or an operation on the touch panel to the control unit 111. For example, in response to the input instruction from the operation input unit 114, the control unit 111 controls the image reading unit 116 to read an image on an original document by using the image reading unit 116 and controls the printing unit 115 to print the image on the original document onto a paper medium or the like by using the printing unit 115. Further, the operation input unit 114 accepts the input of a payment method by the user's operation, for example. The payment method is payment by cash or mobile terminal.

Further, the operation input unit 114 accepts the input of a payment method for paying a fee for the use of a service provided from the image forming apparatus 1000, such as a printing service or a scanning service, by a touch of the user. When a plurality of mobile terminals have used a service provided by the image forming apparatus 1000, the payment method indicates whether to collectively charge one specific mobile terminal or individually charge the plurality of mobile terminals.

(6) Charging Processing Unit 117, Data Communication Unit 118, and Short-Range Wireless Communication Unit 119

The charging processing unit 117 executes a process for charging a use fee for a printing service, a scanning service, or the like.

The data communication unit 118 is connected to the public network 2000 via a local area network (LAN), which is a local network of a service provider and communicates with the server device 2001. In particular, when the server device 2001 is designated as the output destination of the image data 130, the data communication unit 118 establishes connection with the server device 2001 on the public network 2000 in accordance with the URL indicated in the upload information 134, and uploads a file storing the image data 130.

When two or more of the mobile terminals 200a, 200b, 200c, and 200d, which are designated as the type of output destination of the image data 130, are designated as the output destinations of the image data 130, the short-range wireless communication unit 119 performs inter-application communication on the mobile terminals designated as the output destinations among the mobile terminals 200a, 200b, 200c, and 200d, which are located in the wireless communication area 30, using wireless connection in ad hoc mode by using the antenna 120, and transmits the image data 130 to the mobile terminals belonging to the selection group 40 among the mobile terminals 200a, 200b, 200c, and 200d. In ad hoc mode, the mobile terminals 200a and 200b and the short-range wireless communication unit 119 share an extended service set identifier, and wireless communication over "1" hop is performed. Since the number of hops for wireless connection in ad hoc mode is "1", the mobile terminals 200a and 200b do not access, through the image forming apparatus 1000, a local network of the service provider associated with the image forming apparatus 1000. The limited number of hops can maintain security of the local network. Further, short-range wireless connection between the single image forming apparatus 1000 and the plurality of mobile terminals 200a and 200b by utilizing the features of Wi-Fi wireless connection eliminates the time-consuming input operation for designating a storage location. Moreover, wireless connection with the mobile terminals 200a and 200b is performed without using lines of communication carriers. Thus, the service provider bears no additional communication fee. There is room for the scanning service provider to flexibly create a transmission method or a fee system of service fees, thereby enabling the scanning service provider to further expand the range of scanning services.

(7) Facsimile Communication Unit 121 and File Recording Unit 122

The facsimile communication unit 121 performs facsimile communication with any other facsimile terminal or the like via a public line or the like.

When a folder configured on the removable medium 1003 attached to the slot 1002 is designated as an output destination, the file recording unit 122 writes the image data 130 stored in the storage unit 113 to the removable medium 1003 attached to the slot 1002 in accordance with the copy destination information 133.

(8) Screens Configured by Screen Configuration Unit 141

Screens configured by the screen configuration unit 141 will be described. Daring the execution of the scanning service, the screen configuration unit 141 displays a scanning condition setting screen SC11, an original document preparation screen SC12, a scanning screen SC13, and a payment screen SC14 illustrated in FIG. 4 in the scanning condition setting stage, the original document preparation stage, the document scanning in progress stage, and the checkout stage, respectively, to prompt the user to perform appropriate operations.

Figure 4:
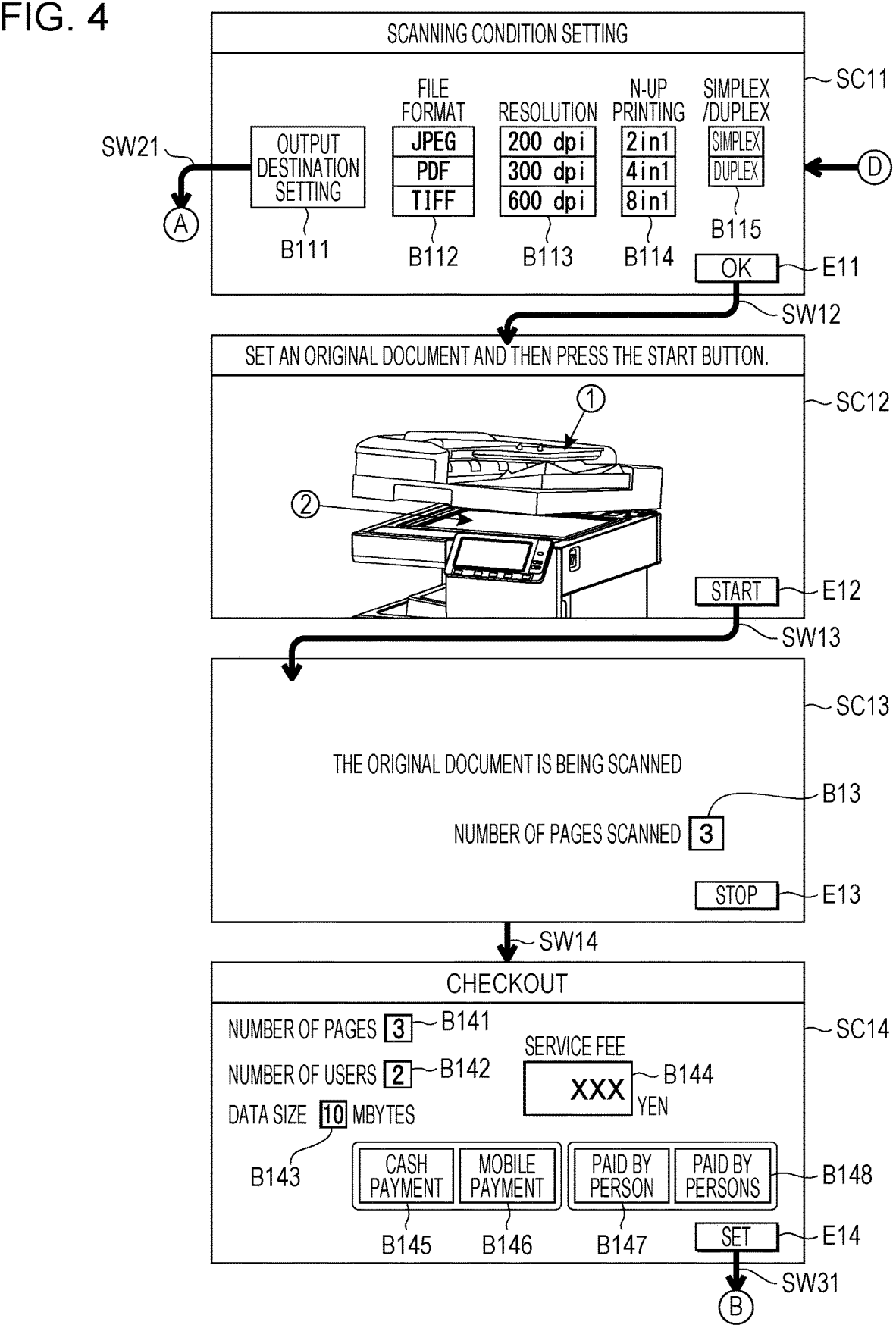
FIG. 4 illustrates a scanning condition setting screen, an original document preparation screen, a scanning screen, and a payment screen.

As illustrated in FIG. 4, the scanning condition setting screen SC11 includes an output destination setting button B111, a file format designation menu B112, a resolution designation menu B113, an N-up printing menu B114, a simplex/duplex designation menu B115, and an OK button E11.

The output destination setting button B111 is operated by a user to make a transition to the display of an output destination type selection screen SC21 described below. The file format designation menu B112 presents a plurality of file formats of image data, such as JPEG, PDF, and TIFF and accepts the designation of any file format. The resolution designation menu B113 presents a list of resolutions such as 200 dpi, 300 dpi, and 600 dpi to set any of the resolutions in accordance with a user operation. The N-up printing menu B114 and the simplex/duplex designation menu B115 accept the setting of 2in1, 4in1, or 8in1 and either simplex (single-sided) printing or duplex (double-sided) printing.

The original document preparation screen SC12 is a screen displayed after scanning conditions are set on the scanning condition setting screen SC11 to promote preparation of the original document to be read. The original document preparation screen SC12 includes a message that prompts a user to set the original document on a feeder of a document reader disposed in an upper portion of the image forming apparatus 1000 or to place the original document on a platen of the document reader, and a Start button E12 for accepting an instruction from the user to start scanning after the user has set the original document.

The scanning screen SC13 is a screen displayed when the scanning of the original document is started in response to the operation of the Start button E12 displayed on the original document preparation screen SC12. The scanning screen SC13 includes a number-of-pages counter B13 indicating the number of currently scanned pages, and a Stop button E13 for accepting the stop of the scanning process.

The payment screen SC14 is a screen generated when the number of scanned pages of the original document to be scanned, the data size of the image data, and the number of users belonging to the selection group 40 are set. The payment screen SC14 includes the number of pages B141 of the original document to be scanned, the number of users B142 corresponding to the number of mobile terminals identified as output destinations, the data size B143 of the image data read by the image reading unit 116, a service fee to be charged B144, which is calculated based on the number of pages B141, the number of users B142, and the data size B143, buttons B145 and B146 for respectively accepting the designation of payment by cash and payment by mobile terminal, buttons B147 and B143 for respectively accepting the designation of payment made by a person and payment made by persons, and a Set button E14 operated after the user have confirmed the settings described above.

Figure 5:
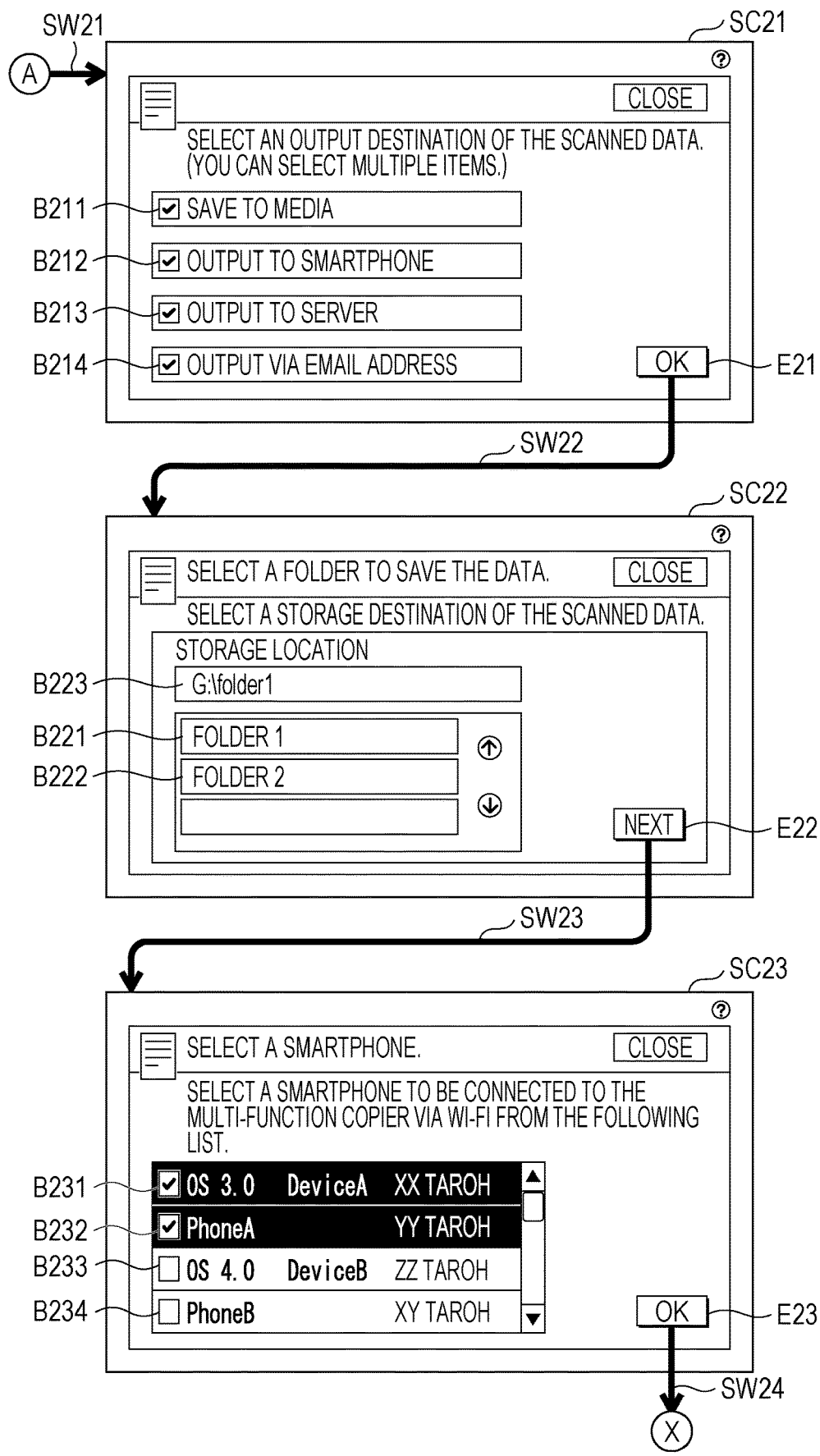
FIG. 5 illustrates an example of an output destination type selection screen, a folder input screen, and a mobile terminal selection screen.
Figure 6:
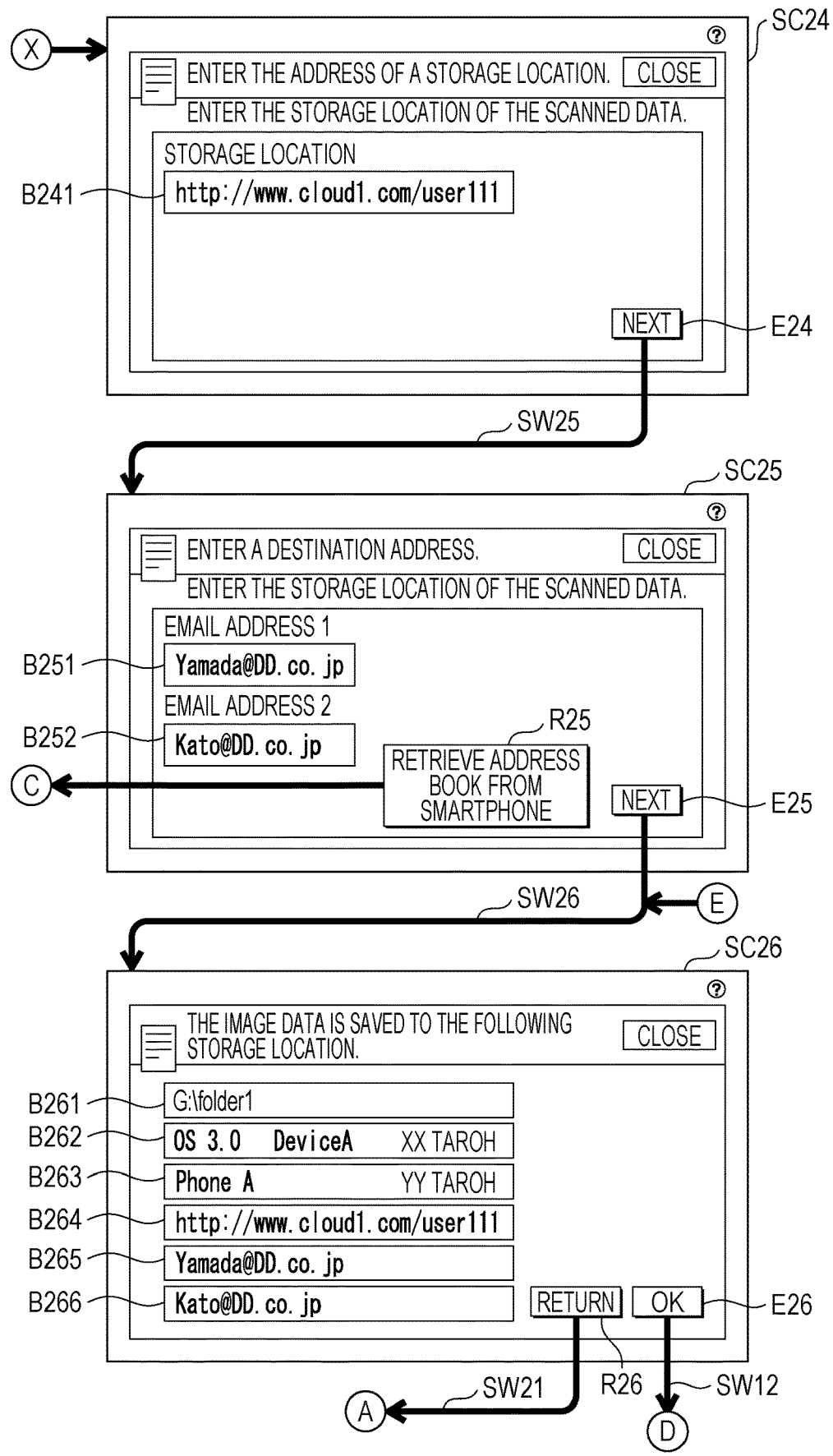
FIG. 6 illustrates an example of a uniform resource locator (URL) input screen, an email address input screen, and an output destination confirmation screen.
Figure 7:
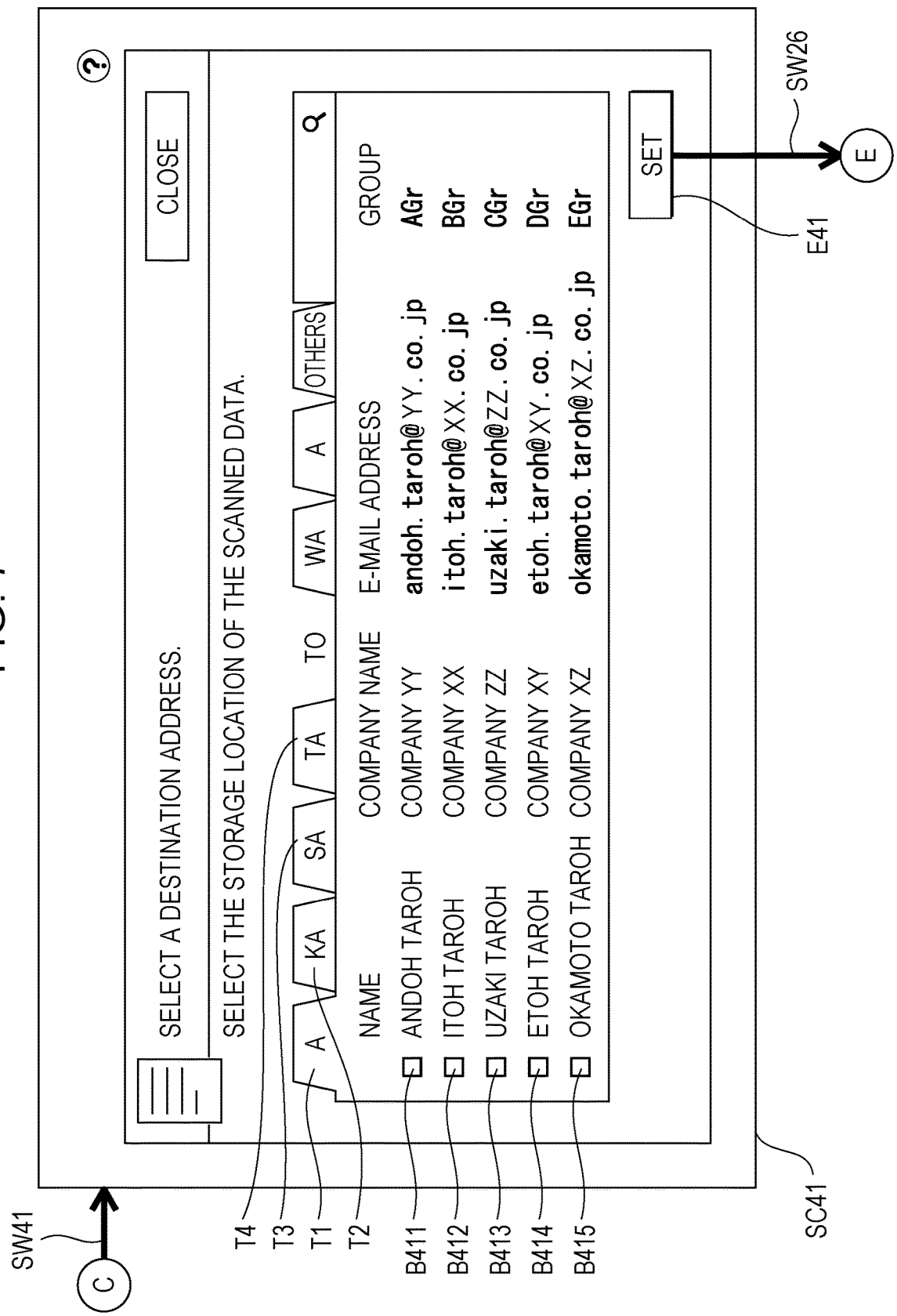
FIG. 7 illustrates an example of an email address book screen.

When the output destination setting button B111 is operated on the scanning condition setting screen SC11 illustrated in FIG. 4, the screen configuration unit 141 creates an output destination type selection screen SC21, a folder input screen SC22, and a mobile terminal selection screen SC23 illustrated in FIG. 5, a URL input screen SC24, an email address input screen SC25, and an output destination confirmation screen SC26 illustrated in FIG. 6, and an email address book screen SC41 illustrated in FIG. 7 to accept the detailed settings of the output destination.

As illustrated in FIG. 5, the output destination type selection screen SC21 includes checkboxes B211, B212, B213, and B214 and an OK button E21. The checkboxes B211, B212, B213, and B214 accept a check of "Save to media", "Output to smartphone", "Output to server", and "Output via email address" options, respectively. The "Save to media" option indicates an output form in which image data is saved to the removable medium 1003 attached to the slot 1002. The "Output to smartphone" option indicates an output form in which image data is saved to the mobile terminals 200a, 200b, 200c, and 200d located in the wireless communication area 30. The "Output to server" option refers to an output form indicating that image data is output to the server device 2001 on the public network 2001. The "Output via email address" option indicates an output form in which an electronic mail having attached image data is transmitted to the device 2002 connected to the public network 2000. The OK button E21 accepts the confirmation of the selected content from the user after the selection of one or more output destination type checkboxes.

The folder input screen SC22 is a screen displayed only when the "Save to media" option is selected as one of the output destination types on the output destination type selection screen SC21. The folder input screen SC22 includes folder display fields B221 and B222 indicating folders configured on the removable medium 1003 attached to the slot 1002, a folder input field B223 that displays a folder selected from among the folders indicated in the folder display fields B221 and B222, and a Next button E22 that accepts the user's confirmation of the input item.

The mobile terminal selection screen SC23 is a screen displayed only when the "Output to smartphone" option is selected as one of the output destination types on the output destination type selection screen SC21. The mobile terminal selection screen SC23 includes checkboxes B231, B232, B233, and B234 corresponding to the mobile terminals 200a, 200b, 200c, and 200d located in the wireless communication area 30, respectively, and an OK button E23. The checkboxes B231, B232, B233, and B234 are used to accept the designation of any mobile terminal (the mobile terminal 200a, 200b, 200c, or 200d) to be selected. The OK button E23 is used to accept the user's confirmation of the input item.

The URL input screen SC24 is a screen displayed only when the "Output to server" option is selected as one of the output destination types on the output destination type selection screen SC21. The URL input screen SC24 includes a URL input field B241 for accepting the input of locator information (URL) identifying the location of the server as the output destination, and a Next button E24 for accepting the operation of confirming the input URL from the user.

The email address input screen SC25 is a screen displayed only when the "Output via email address" option is selected as one of the output destination types on the output destination type selection screen SC21. The email address input screen SC25 includes email address input fields B251 and B252 for accepting the input of email addresses, an address book retrieval button R25 for retrieving an address book from a mobile terminal, and a Next button E25 for accepting the operation of confirming the input email addresses from the user.

The output destination confirmation screen SC26 is a screen that promotes confirmation of an output destination input through the folder input screen SC22, the mobile terminal selection screen SC23, the URL input screen SC24, and the email address input screen SC25. The output destination confirmation screen SC26 includes output destination display fields B261 to B266, an OK button E26, and a Return button R26.

The email address book screen SC41 illustrated in FIG. 7 is a screen displayed when the address book retrieval button R25 is pressed on the displayed email address input screen SC25. The email address book screen SC41 includes tabs T1, T2, T3, and T4 respectively corresponding to the columns of the Japanese hiragana syllabary (i.e., the vowel column ("a" column), k-column ("ka" column), the s-column ("sa" column), and the t-column ("ta" column)), and display fields for the respective tabs. For example, the display field for the tab T1 includes a plurality of email address fields B411, B412, B413, B414, and B415 for names starting with letters in the "a" column. The same applies to the display fields for the tabs T2, T3, and T4.

As described above, the screen configuration unit 141 implements a hierarchical input operation such that the selection of an output destination type is accepted on the output destination type selection screen SC21, a screen selected from among the folder input screen SC22, the mobile terminal selection screen SC23, the URL input screen SC24, and the email address input screen SC25 is displayed in accordance with the selected output destination type, and the input of specific information on an output destination is accepted from the user.

When the input items on the payment screen SC14 illustrated in FIG. 4 are confirmed and the Set button E14 is operated, the image forming apparatus 1000 enters the transmission stage in which image data is transmitted. At this time, the screen configuration unit 141 displays an image data transmission screen SC31 illustrated in FIG. 8. The image data transmission screen SC31 is a screen displayed during the transmission of the image data 130. The image data transmission screen SC31 includes a pop-up screen M31 indicating which file is currently being transmitted when a plurality of files storing image data are transmitted. The pop-up screen M31 includes a Cancel button B31 for accepting the operation of stopping data transmission from the user.

The image data transmission completion screen SC33 is a screen displayed when the transmission of image data is completed. The image data transmission completion screen SC33 includes a pop-up screen M33 indicating the number of image data files transmitted. The pop-up screen M33 includes an OK button B33 for accepting the user's confirmation operation.

1.3 Mobile Terminals 200a, 200b, . . . , and 200e

A description will be given here of the mobile terminal 200a as a representative of the mobile terminals 200a, 200b, . . . , and 200e. The mobile terminals 200b, . . . , and 200e have substantially the same configuration as the mobile terminal 200a and will not be described herein. The components of the mobile terminals 200b, . . . , and 200e are denoted by the same numerals as those of the components of the mobile terminal 200a.

Figure 9:
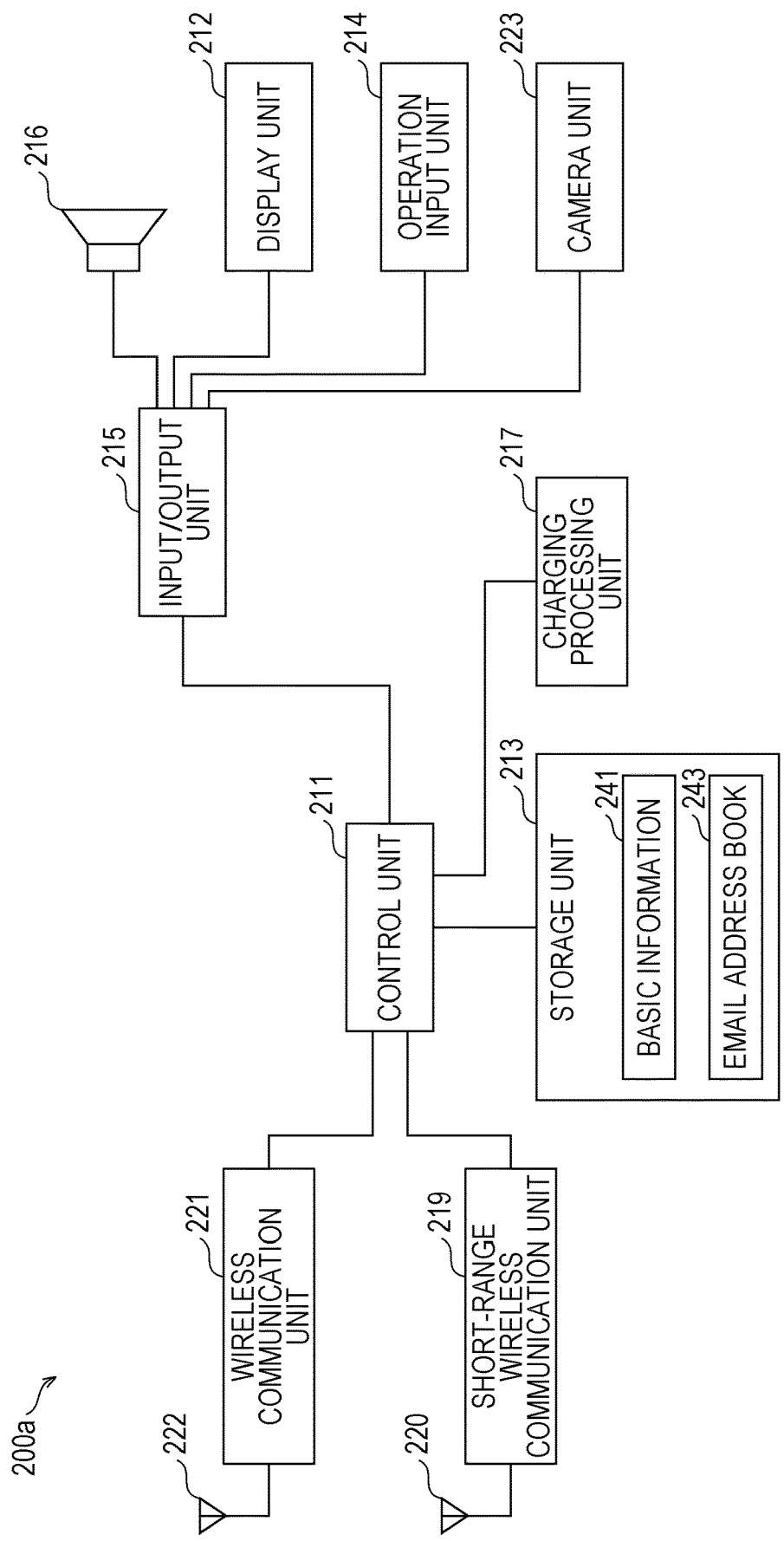
FIG. 9 is a functional block diagram illustrating a functional configuration of the mobile terminal.

FIG. 9 is a functional block diagram illustrating a functional configuration of the mobile terminal 200a. The mobile terminal 200a is a portable mobile communication device having, for example, a telephone call function, an electronic mail transmitting and receiving function, a network connection function, a picture-taking function, and an application program executing function. As illustrated in FIG. 9, the mobile terminal 200a includes a control unit 211, a display unit 212, a storage unit 213, an operation input unit 214, an input/output unit 215, a speaker 216, a charging processing unit 217, a short-range wireless communication unit 219, an antenna 220, a wireless communication unit 221, an antenna 222, and a camera unit 223.

(1) Storage Unit 213

The storage unit 213 serves as a work area for a control program executed by the control unit 211. The storage unit 213 includes a RAM or the like that stores various control programs, application programs, basic information 241, which is identification information of the mobile terminal 200a, an email address book 243, and image data.

As illustrated in FIG. 10A, the basic information 241 includes a model name (Phone A) and the user name "ZZ Taroh". Examples of the basic information include basic information 242 illustrated in FIG. 10B, which includes an operating system (OS) name (Operating System 3.0), the model name "device A", and the user name "XX Taroh". Information on elements of basic information differs from one mobile terminal manufacturer to another.

The email address book 243 includes one or more pieces of address information. Each piece of address information includes a name, a company name, an email address, and a group. The name is the name of the destination user indicated by the email address, the company name indicates the organization to which the user belongs. The email address is an email address to which an electronic mail is directed, and the group indicates a group to which the email address belongs. The email address book 243 is used to present candidate destinations to the user to transmit an email.

For example, as illustrated in FIG. 10C, in the email address book 243, a plurality of email addresses ("andoh.taroh@YY.co.jp", "itoh.taroh@XX.co.jp", etc.) are associated with the names of the destination users (Andoh Taroh, Itoh Taroh, etc.), company names (Company YY, Company XX, etc.), and groups (AGr, BGr, etc.), respectively.

(2) Control Unit 211

The control unit 211 reads a necessary control program or the like from the storage unit 213 and executes the control program or the like to control the overall operation of the mobile terminal 200a. The control unit 211 further reads and executes an application program. The control unit 211 controls the wireless communication unit 221, the short-range wireless communication unit 219, the charging processing unit 217, and the input/output unit 215. The control unit 211 accesses the storage unit 213 to read and write information.

(3) Display Unit 212

The display unit 212 is a liquid crystal display device, for example. The display unit 212 may be an EL display device or the like. The display unit 212 displays a screen including operation images or the like that is touched by the user to receive a printing service or a scanning service. One of the operation images is operated to start a wireless communication transmission application program (hereinafter referred to as a wireless communication transmission application). For example, the wireless communication transmission application is a computer program for receiving image data from the image forming apparatus 1000 and storing the received image data and is also a computer program for transmitting picture data or document data to the image forming apparatus 1000. The screen displayed on the display unit 212 may show identification information identifying the mobile terminal 200a.

(4) Operation Input Unit 214

The operation input unit 214 has a plurality of operation keys and a touch panel overlaid on a screen of the display unit 212. The operation input unit 214 outputs an input instruction corresponding to an operation with the operation keys or an operation on the touch panel to the control unit 211 via the input/output unit 215. For example, in response to the input instruction from the operation input unit 214, the control unit 211 receives image data from the image forming apparatus 1000 via the short-range wireless communication unit 219 and the antenna 220.

(5) Speaker 216, Camera Unit 223, and Input/Output Unit 215

The speaker 216 outputs audio in a conversation with any other mobile terminal or the like. Further, the speaker 216 reproduces audio data stored in the storage unit 213 under control of the control unit 211 and outputs audio.

The camera unit 223 captures an image of a surrounding scene under control of the control unit 211 and generates a still image or a moving image.

The input/output unit 215 relays input and output of data between the control unit 211 and each of the display unit 212, the operation input unit 214, the speaker 216, and the camera unit 223.

(6) Charging Processing Unit 217

The charging processing unit 217 determines whether to authorize the payment of, for example, charging information indicating a fee to be charged, which is transmitted from the image forming apparatus 1000, and transmits a determination result to the image forming apparatus 1000.

(7) Short-Range Wireless Communication Unit 219, Antenna 220, Wireless Communication Unit 221, and Antenna 222

The short-range wireless communication unit 219 communicates with communication terminals located in the wireless communication area 30 in which the mobile terminal 200a is located over short-range wireless communication via the antenna 220. The communication terminal located in the wireless communication area 30 and serving as a communication partner is the image forming apparatus 1000, by way of example. If the mobile terminal 200a is located in another wireless communication area, the short-range wireless communication unit 219 communicates with communication terminals located in the other wireless communication area.

The wireless communication unit 221 wirelessly communicates with a wireless base station via the antenna 222. The wireless base station is connected to one end of a mobile phone network, and another wireless base station is connected to the other end of the mobile phone network. The other wireless base station wirelessly communicates with other communication terminals. Consequently, the wireless communication unit 221 can communicate with other communication terminals or the like via the antenna 222, the wireless base station, the mobile phone network, and the other wireless base station.

(8) Screens Displayed on Display Unit 212

Screens displayed on the display unit 212 will be described. The screens displayed on the display unit 212 include an application start screen SC30, an image data reception screen SC32, and an image data reception completion screen SC34 illustrated in FIG. 8.

The application start screen SC30 is a start screen used to start a wireless communication transmission application. The application Start screen SC30 includes a button B30 for accepting a scanning service starting operation.

The image data reception screen SC32 is a screen displayed when the image forming apparatus 1000 starts transmission of image data and the short-range wireless communication unit 219 starts reception of image data. The image data reception screen SC32 includes a pop-up screen M32 indicating which file is being received among a plurality of transmitted files storing image data. The pop-up screen M32 includes a Cancel button E32 for canceling the reception of image data. The image data reception screen SC32 is continuously displayed during the transmission of image data.

The image data reception completion screen SC34 is a screen displayed at the end of the reception of image data using the short-range wireless communication unit 219. The image data reception completion screen SC34 includes a pop-up screen M34 indicating the completion of the reception of image data files, and a saving confirmation button B34 for saving image data with a name in the storage unit 213. The pop-up screen M34 includes an OK button E34 for confirming the reception of the image data.

1.4 First Example

The following describes a first example, which provides an operation performed in a scanning service provided by the image forming apparatus 1000.

(1) Screen Transition from Scanning to Completion of Transmission of Image Data

A screen transition from scanning to completion of the transmission of image data will be described.

When the scanning function of the image forming apparatus 1000 is started, the screen configuration unit 141 generates the scanning condition setting screen SC11 illustrated in FIG. 4 and displays the scanning condition setting screen SC11 on the display unit 112. When an output destination, a file format, a resolution, N-up printing, and simplex/duplex designation are set on the scanning condition setting screen SC11 and then the OK button E11 is operated, as indicated by an arrow SW12, a screen transition occurs from the scanning condition setting screen SC11 to the original document preparation screen SC12.

When an original document is set in the image forming apparatus 1000 and the Start button E12 is pressed, as indicated by an arrow SW13, a screen transition occurs from the original document preparation screen SC12 to the scanning screen SC13, and the user is informed that scanning is in progress. Subsequently, each time a page of the original document is read during the image scanning operation of the image reading unit 116, the value of the number-of-pages counter B13 increments by 1. When the scanning of the original document is completed, as indicated by an arrow SW14, a screen transition occurs from the scanning screen SC13 to the payment screen SC14. The payment screen SC14 shows the number of pages B141 of the original document, the number of users B142, the data size B143, the service fee to be charged B144, and so on.

Figure 8:
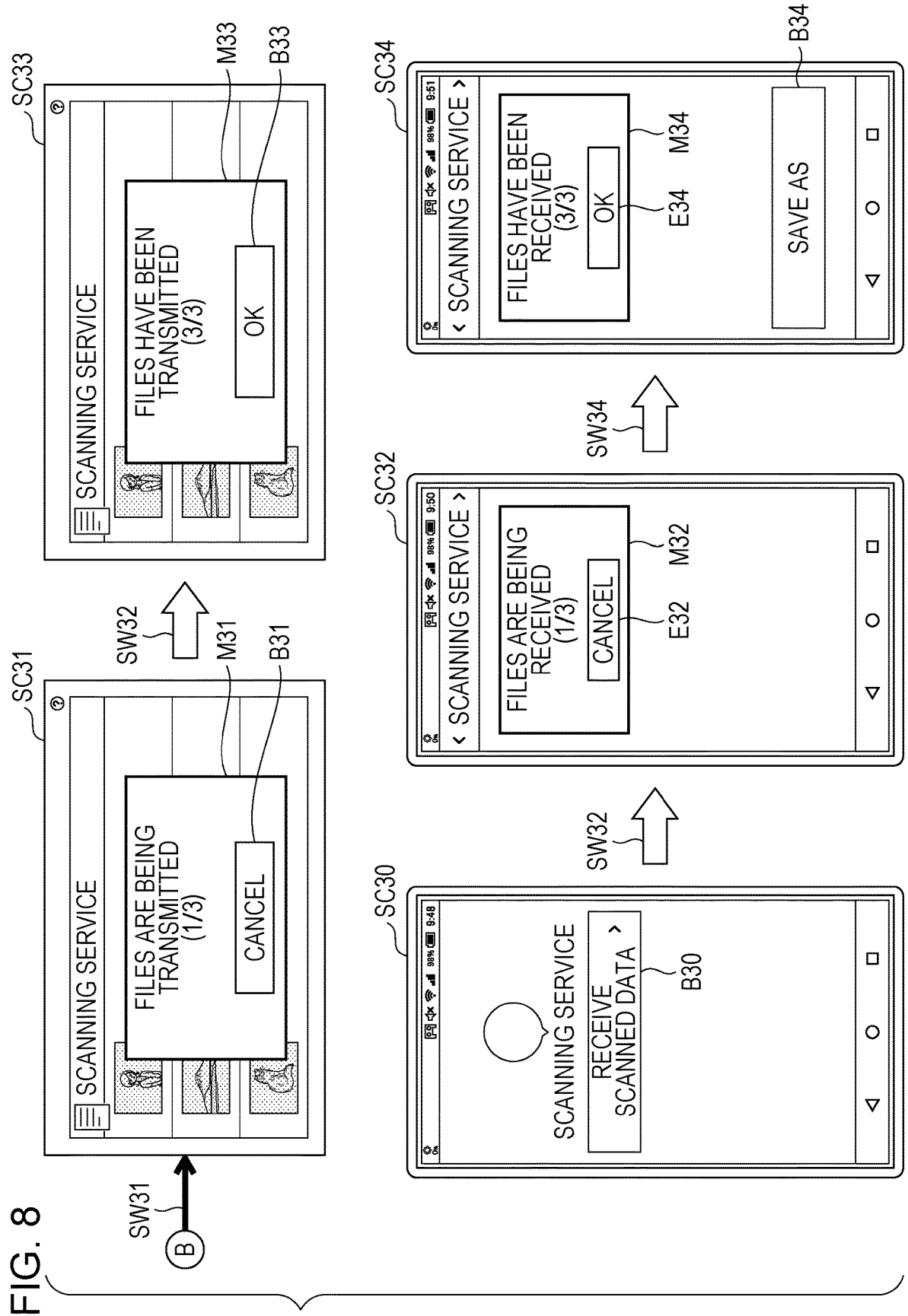
FIG. 8 illustrates an image data transmission screen and an image data transmission completion screen, which are displayed on the image forming apparatus, and an application start screen, an image data reception screen, and an image data reception completion screen, which are displayed on a mobile terminal.

When the Set button E14 is operated on the payment screen SC14, as indicated by an arrow SW31, a screen transition occurs from the payment screen SC14 to the image data transmission screen SC31 illustrated in FIG. 8. The image data transmission screen SC31 shows the transmission of files. When the transmission of image data is started, as indicated by an arrow SW32 in FIG. 8, a screen transition occurs from the application start screen SC30 to the image data reception screen SC32 on the mobile terminals 200a and 200b.

When the transmission of image data from the image forming apparatus 1000 to each mobile terminal is completed, as indicated by an arrow SW33, a screen transition occurs from the image data transmission screen SC31 to the image data transmission completion screen SC33.

On the other hand, also on the mobile terminals 200a and 200b, as indicated by an arrow SW34, a screen transition occurs from the image data reception screen SC32 to the image data reception completion screen SC34.

Accordingly, the transmission and reception of image data are completed.

(2) Screen Transitions in Setting of Output Destination

Screen transitions in the setting of an output destination will be described.

When the output destination setting button B111 is operated on the scanning condition setting screen SC11 illustrated in FIG. 4, as indicated by an arrow SW21, a screen transition occurs from the scanning condition setting screen SC11 to the output destination type selection screen SC21 illustrated in FIG. 5.

On the output destination type selection screen SC21, the user checks any one or all of the checkboxes B211, B212, B213, and B214.

It is assumed here that the user have checked all of the checkboxes B211, B212, 3213, and B214 on the output destination type selection screen SC21. That is, it is assumed that the user have selected all of the output destination types "Save to media", "Output to smartphone", "Output to server", and "Output via email address" using the respective checkboxes on the output destination type selection screen SC21.

Since all the output destination types have been selected, the screen configuration unit 141 sequentially forms the folder input screen SC22, the mobile terminal selection screen SC23, the URL input screen SC24, the email address input screen SC25, and the output destination confirmation screen SC26.

First, as indicated by an arrow SW22, a screen transition occurs from the output destination type selection screen SC21 to the folder input screen SC22. On the folder input screen SC22, for example, the folder "G:\folder1" is selected by the user.

When the Next button E22 is operated on the folder input screen SC22, as indicated by an arrow SW23, a screen transition occurs from the folder input screen SC22 to the mobile terminal selection screen SC23. On the mobile terminal selection screen SC23, the user selects one or multiple mobile terminals.

When the OK button E23 is operated on the mobile terminal selection screen SC23, as indicated by an arrow SW24, a screen transition occurs from the mobile terminal selection screen SC23 to the URL input screen SC24 illustrated in FIG. 6. On the URL input screen SC24, for example, the URL "http://www.cloud1.com/user111" is input.

When the Next button E24 is operated on the URL input screen SC24, as indicated by an arrow SW25, a screen transition occurs from the URL input screen SC24 to the email address input screen SC25. On the email address input screen SC25, for example, the email addresses "Yamada@DD.co.jp" and "Kato@DD.co.jp" are input.

When the Next button E25 is touched on the email address input screen SC25, as indicated by an arrow SW26, a screen transition occurs from the email address input screen SC25 to the output destination confirmation screen SC26 to promote confirmation of the output destination.

When the Return button R26 is operated on the output destination confirmation screen SC26, as indicated by the arrow SW21, a screen transition occurs from the output destination confirmation screen SC26 to the output destination type selection screen SC21 to re-input a type of output destination to select an output destination type.

When the OK button E26 is pressed on the output destination confirmation screen SC26, as indicated by the arrow SW12, a screen transition occurs from the output destination confirmation screen SC26 to the original document preparation screen SC12 illustrated in FIG. 4.

The description of screen transitions in the setting of an output destination is now complete.

(3) Operations in Scanning Service

Operations in the scanning service of the service system 1 will be described.

(a) Overview of Overall Operation in Scanning Service

Figure 11:
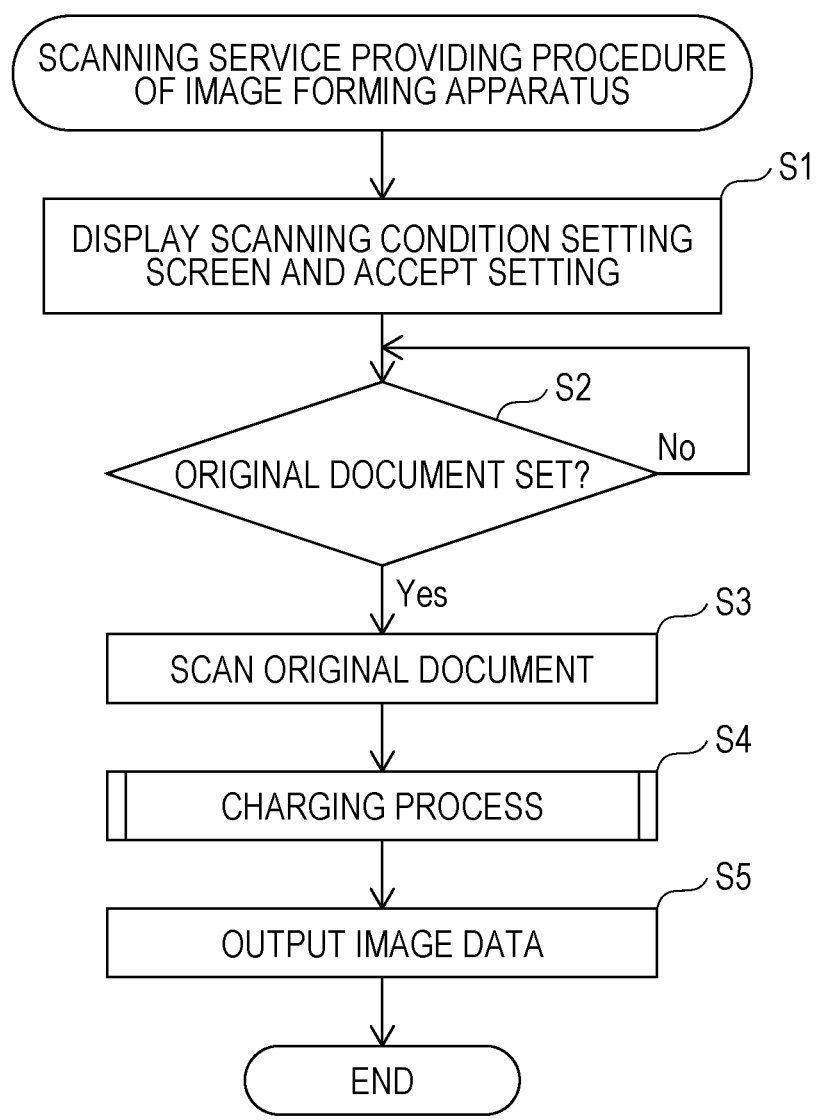
FIG. 11 is a flowchart illustrating a scanning service providing procedure performed by the image forming apparatus.

An overview of the overall operation in the scanning service of the service system 1 will be described with reference to a flowchart illustrated in FIG. 11.

The display unit 112 of the image forming apparatus 1000 displays the scanning condition setting screen SC11 and accepts the setting of the scanning conditions from the user (step S1). Then, the display unit 112 displays the original document preparation screen SC12 to prompt the user to set an original document. Then, the image reading unit 116 waits for an original document to be set (No in step S2). When an original document is set (Yes in step S2), the original document is scanned (step S3). Then, the charging processing unit 117 performs a charging process (step S4). Then, the image forming apparatus 1000 outputs image data to a designated output destination (step S5).

Then, the scanning service is complete.

(b) Output Destination Setting Operation

Figure 12:
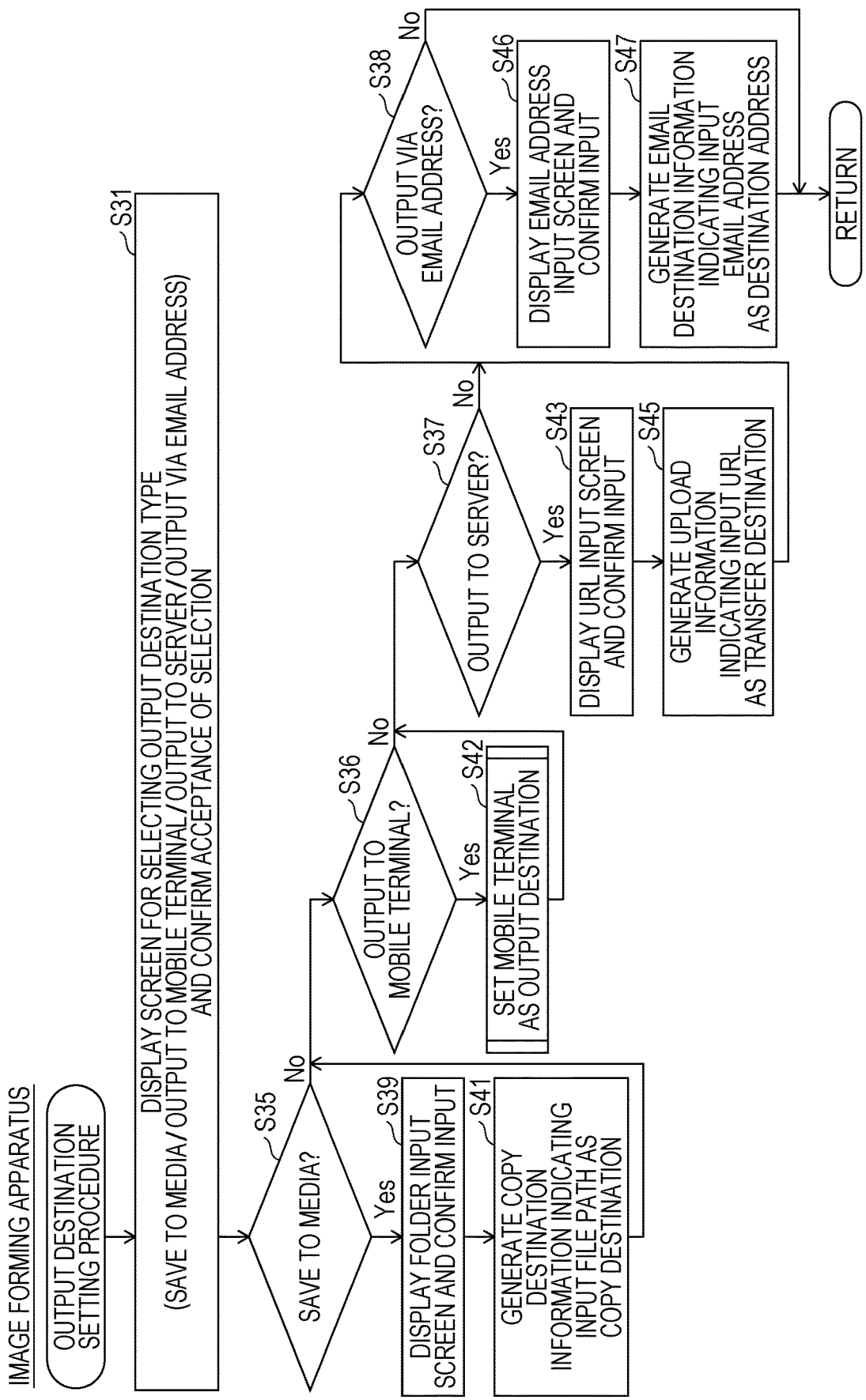
FIG. 12 is a flowchart illustrating an output destination setting procedure.

The operation of setting an output destination of image data, that is, an operation performed when the output destination setting button B111 is operated on the scanning condition setting screen SC11 illustrated in FIG. 4, will be described with reference to a flowchart illustrated in FIG. 12. The procedure for the operation described here illustrates the details of a portion of the procedure in step S1 illustrated in FIG. 11.

The display unit 112 displays the output destination type selection screen SC21 illustrated in FIG. 5, and the operation input unit 114 accepts the selection of an output destination type (step 331).

The control unit 111 determines whether recording on the removable medium 1003 has been selected as an output destination type (step S35). If recording on the removable medium 1003 has been selected (Yes in step S35), the folder input screen SC22 is displayed to confirm the input (file path) to the folder input screen SC22 (step S39). Then, the copy destination information 133 indicating the input file path as the copy destination is generated in the storage unit 113 (step S41).

If recording on the removable medium 1003 has not been selected (No in step S35), the processing of steps S39 and S41 is not performed.

Then, the control unit 111 determines whether mobile terminals (the mobile terminals 200a, 200b, 200c, and 200d located in the wireless communication area 30) have been selected as an output destination type (step S36). If the mobile terminals have been selected (Yes in step S36), the control unit 111 executes a process of selecting a mobile terminal as an output destination (step SA2). The details of the processing of step S42 will be described below. If the mobile terminals have not been selected as an output destination type (No in step S36), the processing of step SA2 is not performed.

Then, the control unit 111 determines whether a server has been selected as an output destination type (step S37). If a server has been selected as an output destination type (Yes in step 337), the display unit 112 displays the URL input screen SC24, and the operation input unit 114 accepts the input of URL (step S43). Then, the control unit 111 generates in the storage unit 113 the upload information 134 containing the input URL character string (step S45).

If a server has not been selected as an output destination type (No in step S37), the processing of steps S43 and S45 is not performed.

Then, the control unit 111 determines whether output via email address has been selected as an output destination type (step S38). If output via email address has been selected as an output destination type (Yes in step S38), the display unit 112 displays the email address input screen SC25, and the operation input unit 114 accepts the input of an email address (step S46). The control unit 111 generates in the storage unit 113 the email destination information 135 including the input email address (step S47).

If output via email address has not been selected as an output destination type (No in step S38), the processing of steps S46 and S47 is not performed.

Then, the operation of setting an output destination of image data is complete.

(c) Operation of Selecting Mobile Terminal as Output Destination

Figure 13:
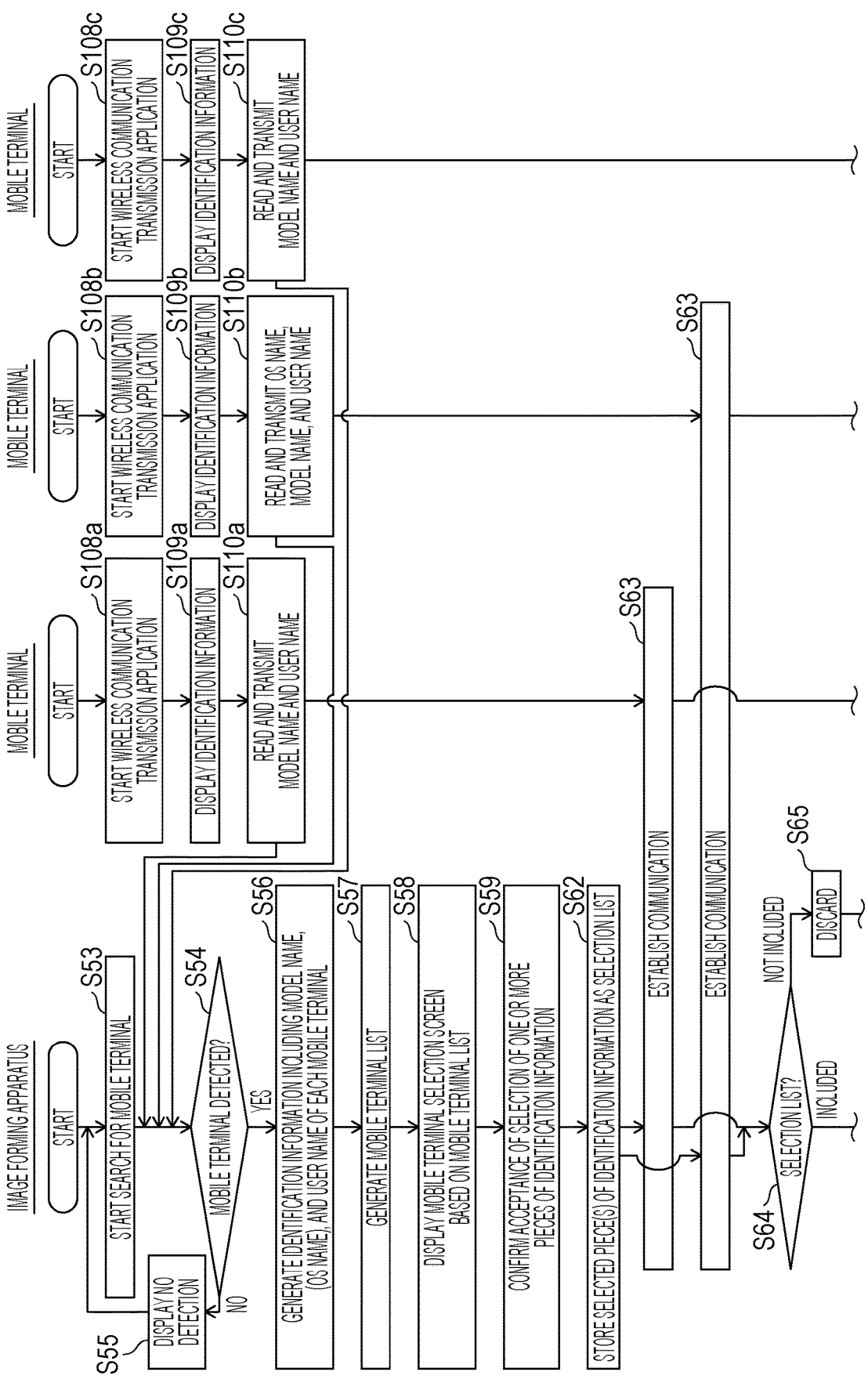
FIG. 13 is a flowchart illustrating a procedure for selecting a mobile terminal.

The operation of selecting a mobile terminal as an output destination will be described with reference to a flowchart illustrated in FIG. 13. The operation described here is a detailed operation in step S42 in FIG. 12.

Each of the mobile terminals 200a, 200b, and 200c located in the wireless communication area 30 starts the wireless communication transmission application (steps S108a, S108b, and S108c) and displays identification information (steps S109a, S109b, and S109c). Each of the mobile terminals 200a and 200c reads and transmits the model name and the user name (steps S110a and S110c). The mobile terminal 200b reads and transmits the OS name, the model name, and the user name (step S110b).

In the image forming apparatus 1000, mobile terminals have been selected as an output destination type. Thus, the image forming apparatus 1000 starts a search for a mobile terminal located in the wireless communication area 30 (step S53), and waits for a mobile terminal to be detected (step S54). If no mobile terminal is detected ("NO" in step S54), the display unit 112 displays no detection (step S55). Then, the control proceeds to step S53. If any mobile terminal is detected ("YES" in step S54), identification information including the model name, the OS name, and the user name of each mobile terminal is generated (step S56), and the mobile terminal list 131 including the generated identification information is generated (step S57). When the mobile terminal list 131 that clarifies one or more mobile terminals is generated through the process described above, the screen configuration unit 141 generates the mobile terminal selection screen SC23 illustrated in FIG. 5 on the basis of the mobile terminal list 131, and the display unit 112 displays the mobile terminal selection screen SC23 (step S58). The operation input unit 114 accepts selection input of one or multiple pieces of identification information and accepts the confirmation of the selection input (step S59).

The control unit 111 writes the selected piece(s) of identification information to the storage unit 113 as the selection list 132 (step S62), and establishes wireless connection with the mobile terminals 200*a* and 200*b*, which are selected on the mobile terminal selection screen SC23, in ad hoc mode (step S63).

After the establishment of wireless connection, if information, instructions, or the like is received from a mobile terminal identified by identification information not included in the selection list 132 ("NOT INCLUDED" in step S64), the received information, instructions, or the like is discarded (step S65).

The description of the operation of selecting a mobile terminal as an output destination is now complete.

(d) Charging Process Operation

Figure 14:
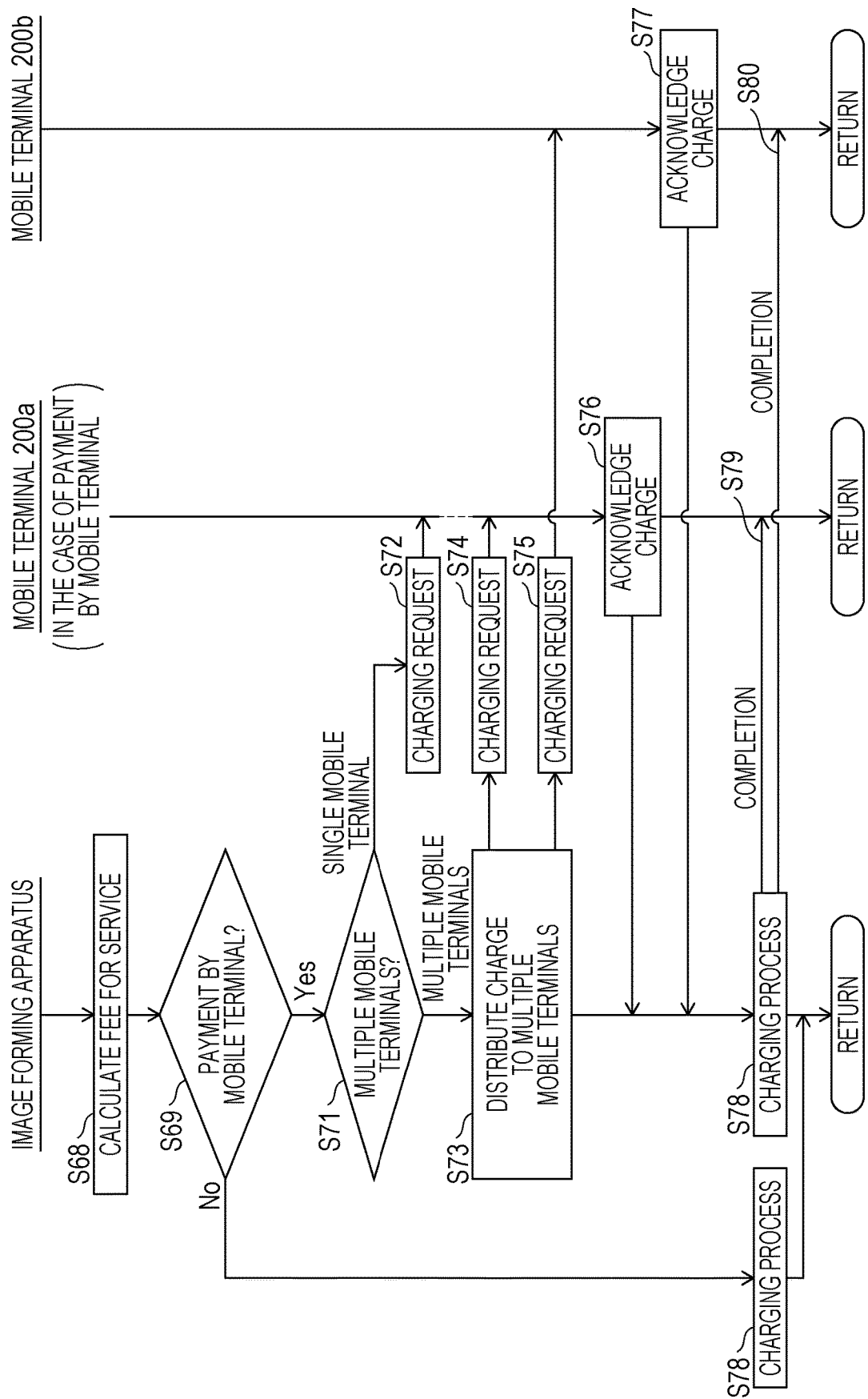
FIG. 14 is a flowchart illustrating a charging process procedure performed by a charging processing unit.

A charging process operation will be described with reference to a flowchart illustrated in FIG. 14. The operation described here is a detailed operation in step S4 in FIG. 11.

The fee information generation unit 145 calculates the amount of fee for the service from the number of users, which is equal to the number of mobile terminals identified as the output destination, and the size of the data read by the image reading unit 116 (step S68).

The control unit 111 determines whether payment by cash or payment by mobile terminal has been designated as a payment method (step S69).

If the payment method indicates payment by mobile terminal ("Yes" in step S69), the control unit 111 determines multiple mobile terminals or a single mobile terminal in accordance with the number of pieces of identification information included in the selection list 132 (step S71). In the case of a single mobile terminal ("SINGLE MOBILE TERMINAL" in step S71), a charging request is transmitted to the single mobile terminal (step S72).

In the case of multiple mobile terminals ("MULTIPLE MOBILE TERMINALS" in step S71), the control unit 111 distributes the charge to the multiple mobile terminals (step S73), and transmits the distributed fee information to each of the mobile terminals as a charging request (steps S74 and S75).

The charging processing unit 217 of the mobile terminal 200*a* performs a process of acknowledging the charge in response to the charging request, and notifies the image forming apparatus 1000 of the acknowledgement of the charge (step S76). The charging processing unit 217 of the mobile terminal 200*b* also performs a process of acknowledging the charge in response to the charging request in a similar way, and notifies the image forming apparatus 1000 of the acknowledgement of the charge (step S77).

The charging processing unit 117 performs a charging process (step S78), and transmits a notification indicating the completion of the charging process to the mobile terminals 200*a* and 200*b* (steps S79 and S80).

If the payment method is not payment by mobile terminal, that is, if the payment method is payment by cash ("No" in step S69), the charging processing unit 117 performs a charging process with cash (step S78). The description of the charging process operation is now complete.

(e) Image Data Output Process Operation

Figure 15:
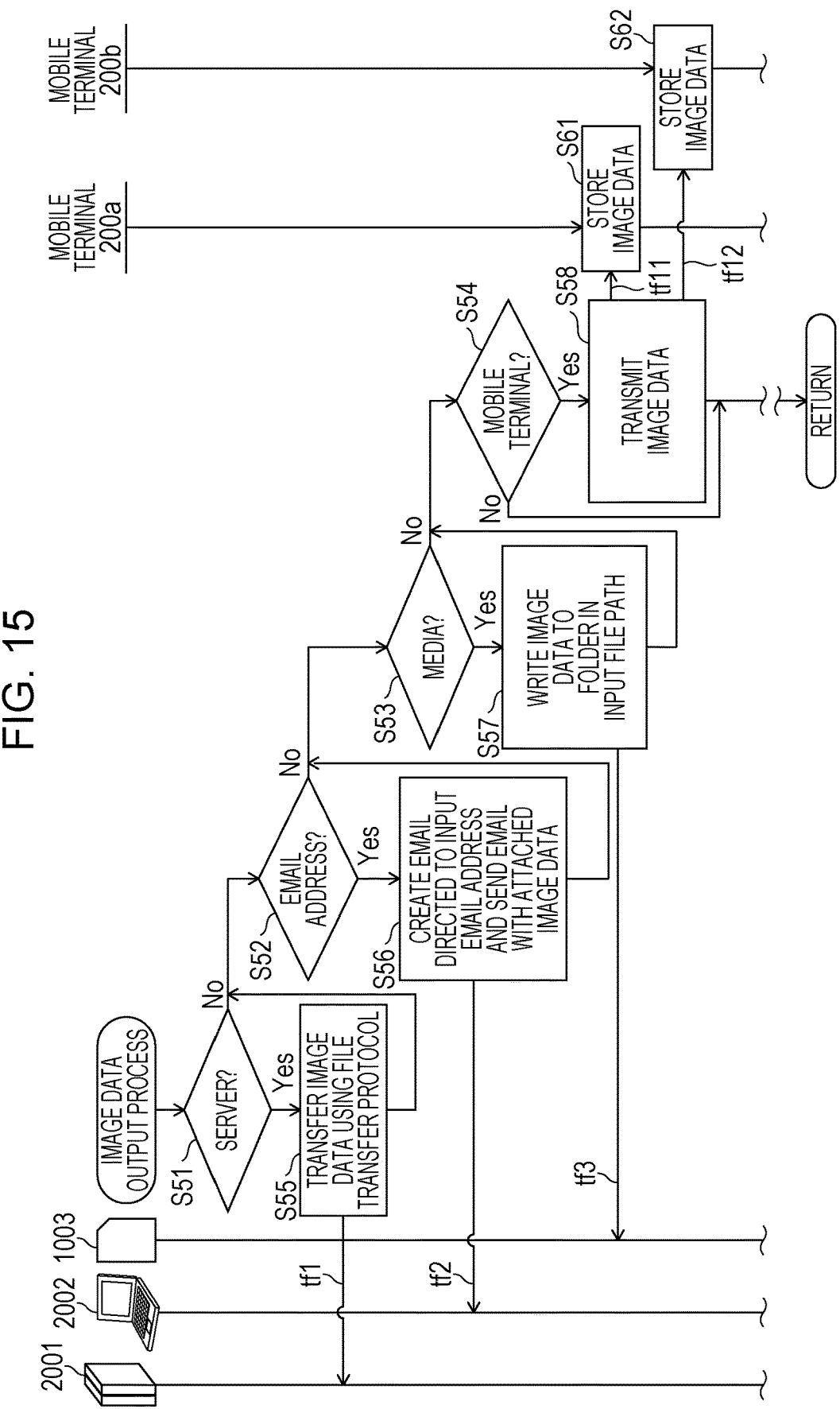
FIG. 15 is a flowchart illustrating the detailed procedure of an image data output process.

An image data output process operation will be described with reference to a flowchart illustrated in FIG. 15. The operation described here is a detailed operation in step S5 in FIG. 11.

The control unit 111 determines whether a server has been selected as the output destination of image data (step S51). If the output destination is a server (Yes in step S51), the transceiving unit 144 executes a file transfer protocol via the data communication unit 118 in accordance with the upload information 134 stored in the storage unit 113 to, as indicated by an arrow tf1, transfer the image data to the server device 2001 connected to the public network 2000 (step S55).

If the output destination is not a server (No in step S51), the processing of step S55 is not performed.

Then, the control unit 111 determines whether output via email address has been selected as the output destination of image data (step S52). If output via email address has been selected (Yes in step S52), the email communication unit 146 creates an electronic mail directed to the email destination information 135 stored in the storage unit 113, attaches the image data 130 to the electronic mail, and, as indicated by an arrow tf2, transmits the created electronic mail to the device 2002 to which the electronic mail is directed and which is connected to the public network 2000 (step S56).

If output via email address has not been selected (No in step S52), the processing of step S56 is not performed.

Then, the control unit 111 determines whether the removable medium 1003 has been selected as the output destination of image data (step S53). If the removable medium 1003 has been selected (Yes in step S53), as indicated by an arrow tf3, the control unit 111 writes the image data to the folder configured on the removable medium 1003, which is identified by the file path to the copy destination information 133 (step S57).

If the removable medium 1003 has not been selected (No in step S53), the processing of step S57 is not performed.

Then, the control unit 111 determines whether mobile terminals have been selected as the output destination of image data (step S54). If mobile terminals have been selected (Yes in step S54), the transceiving unit 144 transmits the image data to the mobile terminals 200*a* and 200*b* via the short-range wireless communication unit 119 (step S58).

The control unit 211 of the mobile terminal 200*a* receives the image data (tf11), and writes the received image data to the storage unit 213 (step S61). The control unit 211 of the mobile terminal 200*b* also receives the image data (tf12), and writes the received image data to the storage unit 213 in a similar way (step S62).

The description of the image data operation is now complete.

(4) Conclusion

As described above, the short-range wireless communication unit 119 transmits read image data only to the mobile terminals 200*a* and 200*b* included in the selection group 40. In this case, the image forming apparatus 1000 does not transmit image data to the mobile terminal 200*c* or 200*d* not included in the selection group 40. This can minimize the possibility that information regarding the image data, which is to be shared by users of a plurality of mobile terminals included in the selection group 40, will be made accessible to a user of any third-party mobile terminal. In addition, people participating in a conference or meeting gather around an image forming apparatus, and image data of materials is sent to their mobile terminals at a time, which can be used instead of replacing delivery of materials. This can reduce the amount of consumption of paper media and contribute to conservation of forest resources.

1.5 Second Example

Figure 16:
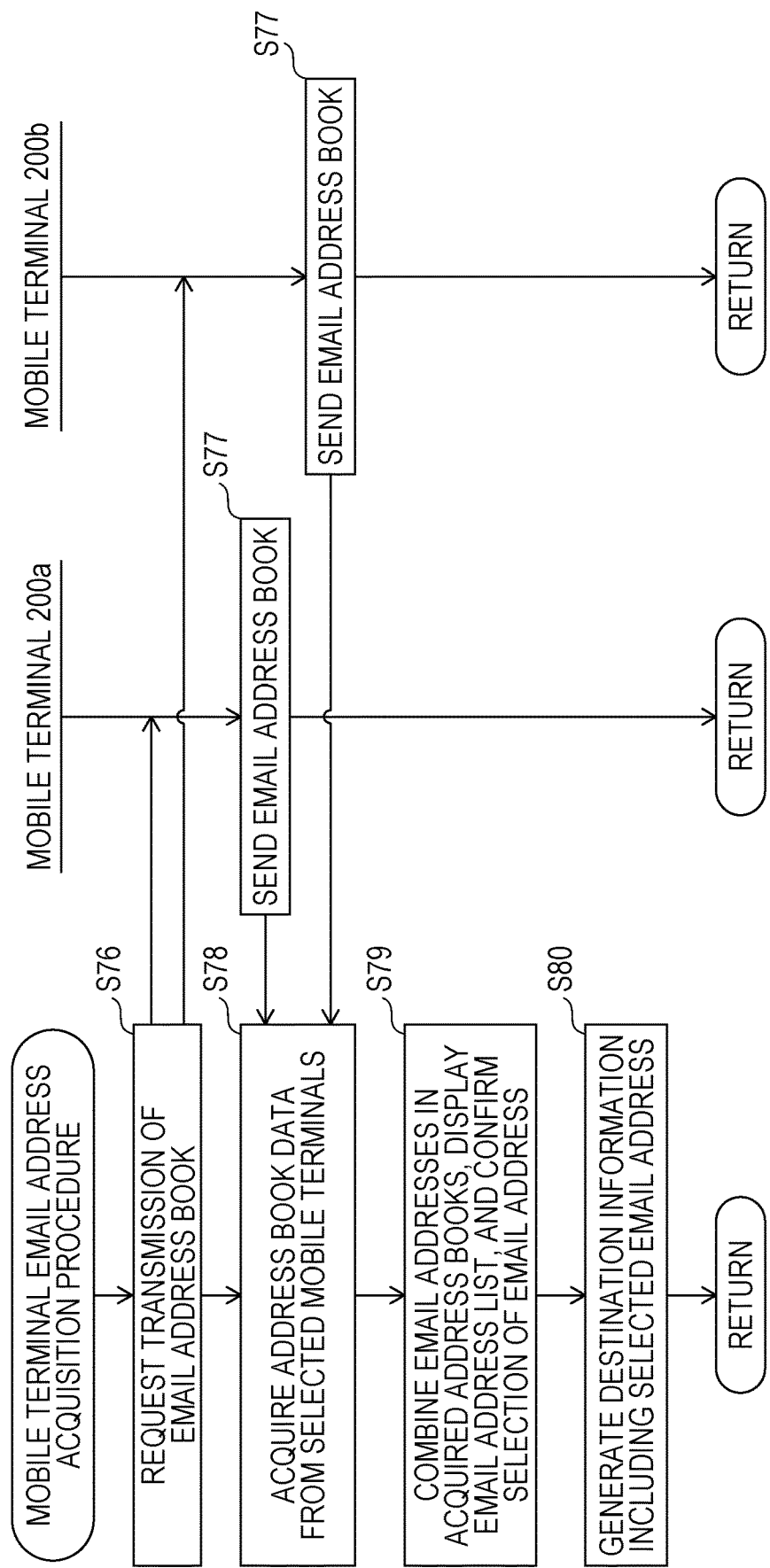
FIG. 16 is a flowchart illustrating a procedure for acquiring email addresses and setting a destination.

A second example, which provides an operation for acquiring email address books, each including electronic mail addresses, from mobile terminals and selecting an electronic mail address from the acquired email address books, will be described with reference to a flowchart illustrated in FIG. 16.

The acquisition of an email address book is performed when the address book retrieval button R25 for acquiring an address book from a mobile terminal is operated on the email address input screen SC25 illustrated in FIG. 6.

In the second example, it is assumed that two or more of the mobile terminals 200a, 200b, 200c, and 200d are selected as one type of output destination and identification information of the selected mobile terminals is included in the selection list 132. Specifically, the mobile terminals 200a and 200b are assumed to be selected.

When the address book retrieval button R25 is operated, the control unit 111 requests the mobile terminals indicated by the identification information included in the selection list 132 to transmit an email address book via the short-range wireless communication unit 119 (step S76).

Upon receipt of a request for transmitting an email address book (step S76), each of the control unit 211 of the mobile terminal 200a and the control unit 211 of the mobile terminal 200b reads the email address book 243 from the storage unit 213 and transmits the read email address book 243 via the short-range wireless communication unit 219 (step S77).

The control unit 111 receives the email address books from the mobile terminal 200a and the mobile terminal 200b via the short-range wireless communication unit 119 (step S78).

The screen configuration unit 141 combines the email address books received from the mobile terminal 200a and the mobile terminal 200b into a single email address book and generates a list including a plurality of email addresses included in the combined email address book, and the display unit 112 displays an email address list screen including the generated list. Then, the operation of selecting any email address is accepted from the user, and confirmation of selection of the email address is accepted (step S79). The control unit 111 creates email destination information containing the selected email address (step S80).

The email communication unit 146 generates an electronic mail directed to the email address included in the email destination information created in the way described above, and transmits the generated electronic mail. The electronic mail has attached image data.

In this example, as described above, email address books are acquired from the mobile terminals 200a and 200b positioned in the wireless communication area 30 of the image forming apparatus 1000, and an electronic mail having attached image data is transmitted using the email address books. Accordingly, even an image forming apparatus installed in a convenience store or the like and presumably used by a large number of unspecified users or an image forming apparatus to which the registration of transmission destinations is not permitted in order to prevent information leakage can send image data to an address specified by an email address without causing the user to feel it bothersome to input an output destination.

This example describes the acquisition of an email address book via wireless connection in ad hoc mode, by way of example. However, any other communication method may be used to add a destination. That is, when a mobile terminal is selected and added on the mobile terminal selection screen SC23, destination information regarding the selected mobile terminal (e.g., the email address of the mobile terminal or the email address book stored in the mobile terminal) may be sent from the selected mobile terminal to the image forming apparatus 1000 by using Bluetooth, MFC, infrared communication, or the like.

Furthermore, when a mobile terminal is selected, an email address book is acquired from the mobile terminal. However, the URL of the server or a file path, to which image data is to be sent, may be acquired from the mobile terminal, the image data may be transmitted to the acquired URL of the server, and the image data may be written to the acquired file path.

1.6 Third Example

A third example describes an operation of the fee information generation unit 145 to calculate a fee in accordance with the number of users or the data size of image data.

The fee information generation unit 145 determines the number of users, on which the fee calculation is based, in accordance with the number of mobile terminals selected as the output destination. If mobile terminals have been selected as an output destination type, the number of mobile terminals shown in the selection list 132 is set as the number of users. If mobile terminals have not been selected as an output destination type, the number of users is set to "1".

When the number of users is calculated in the way described above, the fee information generation unit 145 calculates a fee for the service by using a fee schedule 16 illustrated in FIG. 17 in accordance with the data size of the image data obtained by the reading operation of the image reading unit 116 (when a plurality of pieces of image data are to be transmitted, the sum of the data sizes of the pieces of image data) and in accordance with number of users.

In the fee schedule 16, fees are determined by the limit values of ranges for the number of users and the limit values of ranges for the data size.

For example, when the number of users is in the range of 1 to 5 (numerical range r1) and the data size is less than 1 Mbyte (numerical range r11), the fee is 30 yen. When the number of users is in the range of 6 to 10 (numerical range r2) and the data size is less than 1 Mbyte (numerical range r11), the fee is 150 yen. When the number of users is in the range of 11 to 20 (numerical range r3) and the data size is less than 1 Mbyte (numerical range r11), the fee is 200 yen.

For example, when the number of users is in the range of 1 to 5 (numerical range r1) and the data size is 1 Mbyte or more and less than 3 Mbytes (numerical range r12), the fee is 36 yen. When the number of users is in the range of 6 to 10 (numerical range r2) and the data size is 1 Mbyte or more and less than 3 Mbytes (numerical range r12), the fee is 180 yen. When the number of users is in the range of 11 to 20 (numerical range r3) and the data size is 1 Mbyte or more and less than 3 Mbytes (numerical range r12), the fee is 240 yen.

In the fee schedule 16, accordingly, fees are specified in accordance with the numerical ranges r1, r2, . . . , and r7 for the number of users and in accordance with the numerical ranges r11, r12, . . . , and r16 for the data size.

The fee information generation unit 145 determines, in the fee schedule 16, within which numerical range for the number of users the number of users falls and within which numerical range for the data size the data size falls, specifies a numerical range foe the number of users and a numerical range for the data size, and determines the fee corresponding to the specified numerical ranges as the fee for the service.

That is, the fee information generation unit 145 refers to the fee schedule 136 to determine within which of the numerical ranges r1, r2, r3, r4, r5, etc. for the number of users the number of users falls and within which of the numerical ranges r11, r12, r13, r14, etc. for the data size the data size falls. Accordingly, the fee information generation unit 145 calculates a service fee to be charged. For example, for up to 5 users and up to 5 Mbytes, the service fees are the same even if the number of users or the data size of image data to be sent is increased. Such a novel fee system may make users feel to economical and money-saving to spend money on the scanning service, which can appeal to the users.

1.7 Fourth Example

This example provides an example operation to, when image data is obtained by the scanning operation of the image reading unit 116, transmit the image data and any other image data by using the transceiving unit 144.

Specifically, when image data is obtained by the scanning operation of the image reading unit 116 and when the removable medium 1003 is attached to the slot 1002, a plurality of data display fields indicating data recorded on folders in the removable medium 1003 are displayed, and an indication of whether data exists that is to be transmitted together with the image data is displayed. The data to be transmitted together with image data is not limited to image data and includes various kinds of data such as document data, image data, and spreadsheet data. When such data is present on the removable medium 1003, the data is combined with image data obtained by the scanning operation of the image reading unit 116.

When mobile terminals are selected as an output destination type and when the selection list 132 is created, a combination of image data obtained by the scanning operation of the image reading unit 116 and data recorded on the removable medium 1003 attached to the slot 1002 is transmitted to the mobile terminals 200*a* and 200*b* indicated by identification information in the selection list 132.

For example, even if all of users having the certain relationship described above are away from the workplace such as because of a business trip and the devices available outside the workplace are limited to a Universal Serial Bus (USB) memory (a type of removable medium) and a mobile terminal, data stored in a USB memory of a user can be transmitted to a mobile terminal of another user. The image forming apparatus 1000 can have a hub function for delivery of data stored in a USB memory. This can further enhance the value of the image forming apparatus 1000.

2 Other Modifications

The present disclosure is not limited to the embodiment described above. The present disclosure may be modified as follows.

First Modification

In the example described above, an email address book from a mobile terminal is transmitted using short-range wireless communication. In a first modification, in contrast, an email address is acquired from a mobile terminal by using a two-dimensional barcode. More specifically, in this modification, the control unit 211 of each of the mobile terminals 230*a*, 200*b*, 200*c*, and 200*d* has a function of converting an email address contained in its email address book into a two-dimensional barcode, and an image forming apparatus is provided with an optical reader for reading two-dimensional barcodes. The image forming apparatus according to this modification presents to the user an indication of whether, when output via email address is designated as an output destination type, to input an email address via the optical reader.

On the other hand, the mobile terminal according to this modification executes a function of converting an email address contained in an email address book into a two-dimensional barcode. When the display unit 212 of the mobile terminal is placed on or above the optical reader of the image forming apparatus while displaying the two-dimensional barcode obtained through conversion, the optical reader reads the two-dimensional barcode and outputs the email address corresponding to the two-dimensional barcode. When the email address corresponding to the two-dimensional barcode is output from the optical reader, the control unit 111 of the image forming apparatus 1000 accepts the email address as the output destination of the image data, and generates email destination information directed to the email address, as illustrated in FIG. 3E.

A device that converts an email address into a two-dimensional barcode and that displays the two-dimensional barcode may be separate from the mobile terminals 200*a*, 200*b*, 200*c*, and 200*d*. For example, unlike the smartphone-type mobile terminals 200*a*, 200*b*, 200*c*, and 200*d*, a typical mobile phone that does not have a function of executing an application program may convert an email address into a two-dimensional barcode and display the two-dimensional barcode.

Second Modification

The image forming apparatus according to the embodiment described above is installed in a public place such as a convenience store, and is available to unspecified users. In contrast, an image forming apparatus according to a second modification is an apparatus with limited use and may not provide a scanning service to a user until the authenticity of the user is verified by an authentication server that determines the authenticity of a user. More specifically, when a user desires to use the image forming apparatus according to the second modification, the image forming apparatus acquires password information or biometric information from the user and transmits the password information or biometric information to the authentication server.

The authentication server is located in the same local network as that of a personal information storage data server. The personal information storage data server includes passwords or biometric information of a plurality of users expected to use the image forming apparatus, and a personal email address book. The authentication server acquires the password or biometric information of the user from the personal information storage data server, and performs password authentication based on the password information transmitted from the image forming apparatus or performs biometric authentication based on the biometric information transmitted from the image forming apparatus. Through the password authentication or biometric authentication, a user who is to use the image forming apparatus is identified, and the authenticity of the user is authenticated. Accordingly, the provision of the scanning service presented in the embodiment described above is started.

Since the identity of the user is verified during the authentication of the user described above, the authentication server transmits the email address book stored in advance in the personal information storage data server to the image forming apparatus as information on the user. When transmission of image data via email address is designated as an output destination type, the image forming apparatus displays the email address book transmitted from the authentication server in list form on the email address list screen.

Third Modification

When the email address input screen SC25 is displayed, a soft keyboard may be displayed and the input of an alphanumeric character string indicating an email address may be accepted. In this case, input support may be achieved such that when the first character of the alphanumeric characters is input, one or more predicted candidate names or domain names are presented. When the email address book screen SC41 is displayed, a soft keyboard may be displayed and the input of Roman characters or hiragana (Japanese syllabary) characters may be accepted. An email address book may be searched based on such a character string.

Fourth Modification

A unique reference number may be assigned to each mobile terminal displayed in a mobile terminal list. The mobile terminal list displayed on an image forming apparatus shows the reference numbers together with the identification information. The display of the reference numbers allows a user to identify their own mobile terminal. Further, a reference number is transmitted to each mobile terminal, and each mobile terminal receives the reference number and displays the received reference number.

The display of mobile terminals on the mobile terminal selection screen SC23 may be modified as desired. The storage units 213 of the mobile terminals 200a, 200b, 200c, and 200d are caused to store profile information of the users in advance. The profile information is secondary information regarding a user and is configurable by the user as desired. The profile information includes, for example, age, gender, interests, and home address, or some of them. When receiving a scanning service, each of the mobile terminals 200a and 200b transmits the profile information to the image forming apparatus 1000. The image forming apparatus 1000 receives the transmitted profile information and may display the profile information together with the basic information.

For a mobile terminal in which the wireless communication transmission application has not been started, the presence of the mobile terminal may be expressed by using a default value instead of using the basic information and the profile information. The default value is some information that can be acquired from the mobile terminal when the mobile terminal is searched for in step S53. Model information indicating the model name of the mobile terminal may be acquired by the image forming apparatus 1000 as a default value. If a mobile terminal in which the wireless communication transmission application has not been started is found during the search for a mobile terminal in step S53, the presence of the mobile terminal may be expressed by using the default value on the mobile terminal selection screen SC23. For a mobile terminal represented using a default value, the start of the wireless communication transmission application may be promoted, or a website for downloading the wireless communication transmission application may be presented to promote the download and start of the wireless communication transmission application.

Fifth Modification

The period from when the scanning service is started to when the selection of the mobile terminals 200a and 200b is confirmed (step S53) may be managed as a valid period during which identification information is selectable. The selection list 132 has a plurality of pieces of identification information recorded thereon. After the establishment of communication between the image forming apparatus 1000 and each of the mobile terminals indicated by the pieces of identification information included in the selection list 132, the valid period of the selection group may be determined in the following way.

After the completion of the scanning services for all the mobile terminals indicated by the pieces of identification information included in the selection list 132, that is, when the transmission of multi-level image data generated by the scanning operation is completed, the valid period of the selection group expires. In this case, immediately after the completion of the scanning service, the provision of the next scanning service can be started.

In addition, even after the completion of the scanning service, the valid period of the selection group 40 may be provided with a certain grace period. The valid period of the selection group may expire in response to a user performing an operation of terminating the valid period by using the operation input unit 114 of the image forming apparatus 1000. In this case, even after the expiry of the valid period of the selection group, the scanning service can be provided to the user until the user performs the operation of terminating the valid period.

Sixth Modification

In the embodiment described above, each mobile terminal is a smartphone, which is not limiting. Each mobile terminal may be any other device having the short-range communication function described above. For example, each mobile terminal may be a tablet device, a wearable terminal, or a mobile phone.

Seventh Modification

A destination type selection screen may show facsimile transmission, and accept the selection of a facsimile transmission destination from a user. The image data obtained by the scanning operation may be transmitted to the facsimile transmission destination, which is accepted from the user, via facsimile. The output destination type selection screen SC21 may accept the selection of a facsimile transmission destination as one of the output destination types and accept the input of a facsimile number in accordance with the output to the mobile terminals 200a and 200b or the output to the server device 2001.

Eighth Modification

In the second example, an email address book is acquired from a mobile terminal by acquiring email address books from mobile terminals included in the selection list. If mobile terminals have not been selected as an output destination type and no selection list has been generated, a search through the mobile terminals 200a, 200b, 200c, and 200d may be started at the time when the address book retrieval button R25 for an email address book from a mobile terminal is operated while the email address input screen SC25 is displayed.

Ninth Modification

The output destination type selection screen SC21 illustrated in FIG. 5 is a so-called checkbox-type graphical user interface (GUI) component, which is not limiting. A button-type GUI component may be used to accept a selection made by the user. Any graphic data that is supplied as a library in programming language and that is called a GUI component or a widget may be used. In addition, options that can be written using a grammar for markup language may be used to create the various screens illustrated in FIGS. 4 to 8.

Tenth Modification

The setting items that can be accepted by the scanning condition setting screen SC11 are merely examples. Any other setting item may be added or some of the setting items may be deleted. Examples of the setting items that can be added include original document image quality indicating whether to accept an instruction to read an image with color image quality, monochromatic image quality, or grayscale image quality, and the density with which an original document is read.

Eleventh Modification

The server device 2001 is assumed to be a server device capable of storing data obtained by directly inputting URL, which is not limiting. A server device for a social network service, a server device for an image sharing service, or a device for which user authentication is implemented may be used.

Twelfth Modification

The image forming apparatus 1000 and each mobile terminal are each a computer system including a microprocessor and a memory, and the microprocessor retrieves command code included in the computer program stored in the memory and interprets and executes the command code. A control computer program may be recorded on and provided through a computer-readable recording medium such as a flexible disk, a hard disk, an optical disk, or a memory card. The control computer program may be transmitted via a telecommunication line, a network such as the Internet, or the like.

Thirteenth Modification

The embodiment described above, the examples described above, and the modifications described above may be provided in combination.

The present disclosure may be implemented in various forms without departing from the spirit or main features thereof. The embodiment described above is therefore merely an example in all respects and should not be interpreted as limiting. The scope of the present disclosure is indicated by the appended claims and is not bound by the descriptions provided herein. Additionally, all modifications and variations within the scope equivalent to the claims fall within the scope of the present disclosure.

An image forming apparatus according to an embodiment of the present disclosure is capable of establishing wireless communication only with a plurality of mobile terminals indicated by identification information for which selection has been accepted by using short-range wireless communication, and is useful as a technique for establishing communication between the image forming apparatus and a plurality of mobile terminals via short-range wireless communication.

The present disclosure contains subject matter related to that disclosed in Japanese Priority Patent Application JP 2018-097696 filed in the Japan Patent Office on May 22, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. An image forming apparatus including a wireless communication unit, for communicating with a mobile terminal located in a communication area, the image forming apparatus comprising:
  image reading circuitry that read an image on an original document to generate image data;
  acquisition circuitry that acquire a plurality of pieces of identification information from a plurality of mobile terminals located in the communication area via the wireless communication unit, each of the plurality of pieces of identification information indicating one of the plurality of mobile terminals;
  screen configuration circuitry that generate a screen including the plurality of mobile terminals respectively corresponding to the plurality of pieces of identification information acquired by the acquisition circuitry;
  a display that displays the screen generated by the screen configuration circuitry;
  operation input circuitry that accept, in accordance with operation by an operator, selection of at least one of the plurality of mobile terminals displayed on the display; and
  transceiving circuitry that transmit the image data to the at least one of the plurality of mobile terminals selected by the operation input circuitry,
  wherein each of the plurality of mobile terminals stores an address book, the address book including one or more electronic email addresses, each indicating a destination of an electronic mail,
  wherein the transceiving circuitry receive, from the mobile terminals, the address books stored in the mobile terminals via the wireless communication unit,
  wherein the display combines the received address books into an integrated address book and displays a plurality of electronic email addresses included in the integrated address book,
  wherein the operation input circuitry accept selection of one or more electronic email addresses among the displayed electronic email addresses in accordance with operation by an operator, and
  wherein the image forming apparatus further comprises email communication circuitry that transmit an electronic mail having the image data attached thereto to the one or more electronic email addresses for which the selection has been accepted.

2. The image forming apparatus according to claim 1,
wherein each of the plurality of mobile terminals displays a two-dimensional barcode indicating an electronic email address thereof,
wherein the image forming apparatus further comprises an optical reader that reads the electronic email address from the displayed two-dimensional barcode, and
wherein the email communication circuitry transmit the electronic mail having the image data attached thereto to the read electronic email address.

3. The image forming apparatus according to claim 1,
wherein the image forming apparatus is connected to a server device via a network, the server device storing a plurality of electronic email addresses each indicating an address of one of the plurality of mobile terminals,
wherein the image forming apparatus further comprises data communication circuitry that receive the electronic email addresses of only the plurality of mobile terminals from the server device via the network, and
wherein the email communication circuitry transmit the electronic mail having the image data attached thereto to the received electronic email addresses.

4. The image forming apparatus according to claim 1, further comprising:
fee information generation circuitry that calculate a fee in accordance with a data size of the image data and the number of mobile terminals to which the image data is to be transmitted, and that generate fee information; and
charging processing circuitry that charge the plurality of mobile terminals the calculated fee in accordance with the fee information.

5. The image forming apparatus according to claim 4,
wherein the charging processing circuitry maintain the fee at a constant value until the data size or the number of mobile terminals reaches a predetermined value.

6. The image forming apparatus according to claim 1,
wherein the operation input circuitry accept designation, by a user, of a transportable recording medium or a server device connected to the image forming apparatus via a network as an output destination of the image data, and
wherein the image forming apparatus further comprises data communication circuitry that output the image data to the recording medium or to the server device connected to the image forming apparatus via the network.

7. The image forming apparatus according to claim 1,
wherein when a transportable recording medium having data recorded thereon is attached to the image forming apparatus,
the transceiving circuitry transmit the image data and the data recorded on the transportable recording medium to the plurality of mobile terminals via the wireless communication unit.

8. An image forming apparatus including a wireless communication unit, for communicating with a mobile terminal located in a communication area, the image forming apparatus comprising:
image reading circuitry that read an image on an original document to generate image data;
acquisition circuitry that acquire a plurality of pieces of identification information from a plurality of mobile terminals located in the communication area via the wireless communication unit, each of the plurality of pieces of identification information indicating one of the plurality of mobile terminals;
screen configuration circuitry that generate a screen including the plurality of mobile terminals respectively corresponding to the plurality of pieces of identification information acquired by the acquisition circuitry;
a display that displays the screen generated by the screen configuration circuitry;
operation input circuitry that accept, in accordance with operation by an operator, selection of at least one of the plurality of mobile terminals displayed on the display; and
transceiving circuitry that transmit the image data to the at least one of the plurality of mobile terminals selected by the operation input circuitry,
wherein each of the plurality of mobile terminals displays a two-dimensional barcode indicating an electronic email address thereof,
wherein the image forming apparatus further comprises:
an optical reader that reads the electronic email address from the displayed two-dimensional barcode, and
wherein email communication circuitry transmit an electronic mail having the image data attached thereto to the read electronic email address.

9. The image forming apparatus according to claim 8,
wherein the image forming apparatus is connected to a server device via a network, the server device storing a plurality of electronic email addresses each indicating an address of one of the plurality of mobile terminals,
wherein the image forming apparatus further comprises data communication circuitry that receive the electronic email addresses of only the plurality of mobile terminals from the server device via the network, and
wherein the email communication circuitry transmit the electronic mail having the image data attached thereto to the received electronic email addresses.

10. The image forming apparatus according to claim 8, further comprising:
fee information generation circuitry that calculate a fee in accordance with a data size of the image data and the number of mobile terminals to which the image data is to be transmitted, and that generate fee information; and
charging processing circuitry that charge the plurality of mobile terminals the calculated fee in accordance with the fee information.

11. The image forming apparatus according to claim 10,
wherein the charging processing circuitry maintain the fee at a constant value until the data size or the number of mobile terminals reaches a predetermined value.

12. The image forming apparatus according to claim 8,
wherein the operation input circuitry accept designation, by a user, of a transportable recording medium or a server device connected to the image forming apparatus via a network as an output destination of the image data, and
wherein the image forming apparatus further comprises data communication circuitry that output the image data to the recording medium or to the server device connected to the image forming apparatus via the network.

13. The image forming apparatus according to claim 8,
wherein when a transportable recording medium having data recorded thereon is attached to the image forming apparatus, the transceiving circuitry transmit the image data and the data recorded on the transportable recording medium to the plurality of mobile terminals via the wireless communication unit.

14. An image forming apparatus including a wireless communication unit, for communicating with a mobile terminal located in a communication area, the image forming apparatus comprising:
   image reading circuitry that read an image on an original document to generate image data;
   acquisition circuitry that acquire a plurality of pieces of identification information from a plurality of mobile terminals located in the communication area via the wireless communication unit, each of the plurality of pieces of identification information indicating one of the plurality of mobile terminals;
   screen configuration circuitry that generate a screen including the plurality of mobile terminals respectively corresponding to the plurality of pieces of identification information acquired by the acquisition circuitry;
   a display that displays the screen generated by the screen configuration circuitry;
   operation input circuitry that accept, in accordance with operation by an operator, selection of at least one of the plurality of mobile terminals displayed on the display; and
   transceiving circuitry that transmit the image data to the at least one of the plurality of mobile terminals selected by the operation input circuitry,
   wherein the image forming apparatus is connected to a server device via a network, the server device storing a plurality of electronic email addresses each indicating an address of one of the plurality of mobile terminals,
   wherein the image forming apparatus further comprises:
   data communication circuitry that receive the electronic email addresses of only the plurality of mobile terminals from the server device via the network, and
   wherein the email communication circuitry that transmit the electronic mail having the image data attached thereto to the received electronic email addresses.

15. The image forming apparatus according to claim 14, further comprising:
   fee information generation circuitry that calculate a fee in accordance with a data size of the image data and the number of mobile terminals to which the image data is to be transmitted, and that generate fee information; and
   charging processing circuitry that charge the plurality of mobile terminals the calculated fee in accordance with the fee information.

16. The image forming apparatus according to claim 15, wherein the charging processing circuitry maintain the fee at a constant value until the data size or the number of mobile terminals reaches a predetermined value.

17. The image forming apparatus according to claim 14, wherein the operation input circuitry accept designation, by a user, of a transportable recording medium or a server device connected to the image forming apparatus via a network as an output destination of the image data, and
   wherein the image forming apparatus further comprises data communication circuitry that output the image data to the recording medium or to the server device connected to the image forming apparatus via the network.

18. The image forming apparatus according to claim 14, wherein when a transportable recording medium having data recorded thereon is attached to the image forming apparatus,
   the transceiving circuitry transmit the image data and the data recorded on the transportable recording medium to the plurality of mobile terminals via the wireless communication unit.

\* \* \* \* \*